(12) United States Patent
Song et al.

(10) Patent No.: US 11,125,981 B2
(45) Date of Patent: Sep. 21, 2021

(54) LENS ASSEMBLY AND OPTICAL DEVICE COMPRISING SAME

(71) Applicant: Samsung Electronics Co., Ltd., Gyeonggi-do (KR)

(72) Inventors: Douk-Young Song, Gyeonggi-do (KR); Tae-Kun Lee, Seoul (KR); Soo-Jung Kim, Gyeongsangnam-do (KR); Min-Ki Cho, Seoul (KR); Jung-Hyun Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/494,909

(22) PCT Filed: Mar. 14, 2018

(86) PCT No.: PCT/KR2018/002991
§ 371 (c)(1),
(2) Date: Sep. 17, 2019

(87) PCT Pub. No.: WO2018/174462
PCT Pub. Date: Sep. 27, 2018

(65) Prior Publication Data
US 2020/0088976 A1 Mar. 19, 2020

(30) Foreign Application Priority Data
Mar. 21, 2017 (KR) .......................... 10-2017-0035298

(51) Int. Cl.
*G02B 13/06* (2006.01)
*G02B 7/02* (2021.01)
(Continued)

(52) U.S. Cl.
CPC ............. *G02B 13/06* (2013.01); *G02B 7/021* (2013.01); *G02B 9/34* (2013.01); *G02B 17/023* (2013.01);
(Continued)

(58) Field of Classification Search
CPC .. G02B 13/00; G02B 13/0045; G02B 13/006; G02B 13/0065; G02B 13/06;
(Continued)

(56) References Cited

U.S. PATENT DOCUMENTS 4,311,366 A * 1/1982 Clark .................. G03B 27/52
359/733
4,322,137 A * 3/1982 Nohda .................. A61B 3/14
351/206
(Continued)

FOREIGN PATENT DOCUMENTS

JP 2005-283616 A 10/2005
JP 2008-46174 A 2/2008
(Continued)

OTHER PUBLICATIONS

Korean Search Report dated Jul. 30, 2021.

*Primary Examiner* — Peter D Le
(74) *Attorney, Agent, or Firm* — Cha & Reiter, LLC

(57) ABSTRACT

In a lens assembly structure comprising a plurality of lens assemblies, according to the present invention, at least one part of assemblies among the plurality of lens assemblies comprises: a first lens group having a positive refractive power or a negative refractive power; a second lens group having a positive refractive power; and a bending structure for bending an optical path of the first lens group such that the optical path corresponds to an optical axis direction of the second lens group, wherein the bending structure is disposed on the optical path of the first lens group and an
(Continued)

optical path of the second lens group, optical axes of the first lens groups disposed in each of the at least one part of lens assemblies meet at one point, and optical axes of the second lens groups disposed in each of the at least one part of lens assemblies may form a triangle.

15 Claims, 20 Drawing Sheets

(51) Int. Cl.
*G02B 9/34* (2006.01)
*G02B 17/02* (2006.01)
*H04N 5/225* (2006.01)
*H04N 5/232* (2006.01)

(52) U.S. Cl.
CPC ....... *H04N 5/2254* (2013.01); *H04N 5/23238* (2013.01)

(58) Field of Classification Search
CPC ........ G02B 17/023; G02B 7/02; G02B 7/021; G02B 9/34; H04N 5/2254; H04N 5/23238
See application file for complete search history.

(56) References Cited

U.S. PATENT DOCUMENTS

| | | | | |
|---|---|---|---|---|
| 4,387,967 A * | 6/1983 | Yamazaki | ............. | G02B 13/00 359/687 |
| 4,677,495 A * | 6/1987 | Ito | ............. | H04N 1/193 358/498 |
| 5,235,466 A * | 8/1993 | Ono | ............. | G02B 15/173 348/240.3 |
| 5,808,790 A * | 9/1998 | Otaki | ............. | B82Y 20/00 250/234 |
| 5,808,805 A * | 9/1998 | Takahashi | ............. | G02B 17/08 355/53 |
| 5,822,129 A * | 10/1998 | Sekine | ............. | G02B 13/04 359/651 |
| 7,800,830 B2 * | 9/2010 | Mihara | ............. | G02B 15/173 359/676 |
| 10,027,948 B2 * | 7/2018 | Cole | ............. | H04N 13/243 |
| 2001/0001626 A1 * | 5/2001 | Nakano | ............. | G03B 17/02 396/535 |
| 2002/0021895 A1 * | 2/2002 | Kanai | ............. | G03B 17/04 396/103 |
| 2003/0002150 A1 * | 1/2003 | Obama | ............. | G02B 25/001 359/431 |
| 2007/0183065 A1 * | 8/2007 | Chigasaki | ............. | G02B 7/102 359/819 |
| 2008/0036852 A1 * | 2/2008 | Toyoda | ............. | G02B 27/1066 348/36 |
| 2008/0062530 A1 * | 3/2008 | Hayashide | ............. | G02B 7/023 359/668 |
| 2010/0073459 A1 * | 3/2010 | Wilson | ............. | H04N 5/3415 348/36 |
| 2010/0079733 A1 * | 4/2010 | Lu | ............. | G02B 13/06 353/69 |
| 2010/0182704 A1 * | 7/2010 | Yamashita | ............. | G02B 15/173 359/684 |
| 2011/0007204 A1 * | 1/2011 | Yamano | ............. | G02B 5/223 348/362 |
| 2011/0025866 A1 * | 2/2011 | Seo | ............. | G02B 15/173 348/220.1 |
| 2011/0141576 A1 * | 6/2011 | Seo | ............. | G02B 13/0045 359/683 |
| 2012/0038991 A1 * | 2/2012 | Miyano | ............. | G03B 17/20 359/643 |
| 2012/0092776 A1 * | 4/2012 | Mihara | ............. | H04N 5/2253 359/683 |
| 2012/0212620 A1 * | 8/2012 | Hashimoto | ............. | G02B 7/028 348/164 |
| 2012/0275778 A1 * | 11/2012 | Ogasawara | ............. | F16M 11/041 396/419 |
| 2013/0050408 A1 * | 2/2013 | Masuda | ............. | H04N 5/2254 348/38 |
| 2013/0057972 A1 | 3/2013 | Lee | | |
| 2013/0201281 A1 | 8/2013 | Ollier et al. | | |
| 2014/0002715 A1 * | 1/2014 | Wang | ............. | G02B 15/177 348/345 |
| 2014/0124373 A1 * | 5/2014 | Chen | ............. | G02B 15/22 204/643 |
| 2015/0109485 A1 * | 4/2015 | Ozaki | ............. | G02B 15/177 348/240.3 |
| 2015/0253543 A1 * | 9/2015 | Mercado | ............. | G02B 13/0065 348/370 |
| 2015/0286118 A1 * | 10/2015 | Park | ............. | G03B 21/2066 353/85 |
| 2015/0341557 A1 * | 11/2015 | Chapdelaine-Couture | ............. | G06T 3/0006 348/38 |
| 2018/0039049 A1 | 2/2018 | Lee et al. | | |
| 2018/0241944 A1 * | 8/2018 | Uemura | ............. | H04N 5/2258 |

FOREIGN PATENT DOCUMENTS

| | | |
|---|---|---|
| JP | 2013-66163 A | 4/2013 |
| JP | 2015-230444 A | 12/2015 |
| JP | 2016-511968 A | 4/2016 |
| KR | 10-2009-0120926 A | 11/2009 |
| KR | 10-2013-0025750 A | 3/2013 |
| KR | 10-2014-0000078 A | 1/2014 |
| KR | 10-2018-0015485 A | 2/2018 |
| WO | 2015/179574 A1 | 11/2015 |

\* cited by examiner (a)

(b)

(a)

(b)

LENS ASSEMBLY AND OPTICAL DEVICE COMPRISING SAME

CROSS-REFERENCE TO RELATED APPLICATION(S)

This application is a National Phase Entry of PCT International Application No. PCT/KR2018/002991, which was filed on Mar. 14, 2018, and claims priority to Korean Patent Application No. 10-2017-0035298, which was filed on Mar. 21, 2017, the contents of which are incorporated herein by reference.

BACKGROUND

1. Field

Various embodiments of the disclosure relate to an optical device and, for example, to a lens assembly and an optical device including the same.

2. Description of the Related Art

Optical devices, for example, cameras capable of taking still or moving images, have already been used widely. Recently, there has been widespread use of digital cameras or video cameras having solid-state image sensors, such as charge-coupled devices (CCD) or complementary metal-oxide semiconductors (CMOS). Optical devices adopting solid-state image sensors (CCD or CMOS) make it easier to store, copy, and move images compared with film-type optical devices, and thus are gradually replacing film-type optical devices.

A plurality of lenses may be used to acquire high-quality still images and/or moving images. A lens assembly including a combination of plurality of lenses may have a low f-number and a small aberration, for example, such that still images and/or moving images with a higher quality (higher resolution) may be acquired. A plurality of lenses may be necessary to obtain a low f-number and a small aberration. Such optical devices have largely been configured as devices dedicated to imaging, such as digital cameras, but also have recently been mounted on compact electronic devices, such as mobile communication terminals.

SUMMARY

For the purpose of omnidirectional imaging by an optical device such as a lens assembly, at least one ultra-wide-angle optical device is necessary. When an optical device having a single wide view-angle is configured, the quality of peripheries of images will be degraded, blind spots will occur, and the manufactured optical device will have a large size compared with the performance. When an optical device having two wide view-angles is configured, the quality of peripheries of images will be degraded, heating will occur, and the manufactured optical device will have a large parallax (distance between imaging devices). When an optical device having three or more wide view-angles is configured, degradation of the image quality of the peripheries may be alleviated, but a large amount of heat will be generated by problems related to the position of image sensors and the like, and there will be difficulty in reducing the parallax (distance between imaging devices).

An optical device according to various embodiments of the disclosure has three or more lens assemblies configured to connect at least three optical system structures and has three or more image sensors disposed in a bending type, in order to improve the problem related to the image quality of image peripheries and the limited number of moving image pixels, such that the heating and parallax problems can be alleviated and the periphery performance can be improved.

An optical device according to various embodiments of the disclosure may reduce the parallax distance according to the length and arrangement of a plurality of optical system structures such that the problem of poor short-distance image stitching can be solved.

An optical device according to various embodiments of the disclosure seeks to implement arrangement of an image sensor and a heat-radiating structure such that degradation of the image sensor occurring when taking moving images for a long time may be reduced.

An optical device according to various embodiments of the disclosure seeks to provide a lens assembly which has good optical characteristics such that the same may be easily mounted on a compact electronic device, and which may acquire high-resolution still images and/or moving images.

According to various embodiments of the disclosure, there may be provided a lens assembly structure including a a-plurality of lens assemblies, at least some lens assemblies of the plurality of lens assemblies including: a first lens group having positive refractive power or negative refractive power; a second lens group having positive refractive power; and a bending structure for bending a path of light of the first lens group so as to correspond to an optical-axis direction of the second lens group, wherein the bending structure is disposed on the path of light of the first lens group and on a path of light of the second lens group, optical axes of the first lens groups disposed on the at least some lens assemblies, respectively, meet at a point, and optical axes of the second lens groups disposed on the at least some lens assemblies, respectively, are configured to constitute a triangle.

According to various embodiments of the disclosure, there may be provided an optical device including a plurality of optical system structures, at least some optical system structures of the plurality of optical system structures including: a case including a front surface on which an opening is formed; a lens assembly disposed in the case, the lens assembly including a first lens group including a combination of a plurality of lenses, a second lens group, and a bending structure configured to bend a path of light of the first lens group and to transfer the path of light to the second lens group; and a seating portion disposed in the case such that the first lens group or the second lens group is seated thereon, wherein an outermost lens of the first lens group is exposed to the opening, and optical axes of the first lens groups disposed on respective optical system structures are configured to be perpendicular to the optical axes of the second lens groups.

An optical device according to various embodiments of the disclosure may include at least n identical optical system structures including lens groups ($n \geq 3$), the optical axes f' of the lens groups of respective optical system structures may be disposed on the same plane, and line segments connecting intersection points e' at which extension lines of respective optical axes f' meet may form a regular polygon with n sides.

An optical device according to various embodiments of the disclosure includes three optical system structures, and lens assemblies and image sensors in respective optical system structures are disposed in bending types, thereby alleviating the heating and parallax problems and improving the resolution performance of the center and periphery.

An optical device according to various embodiments of the disclosure may reduce the parallax distance regardless of the size of the plurality of optical system structures (for example, lens assemblies), and the optical systems may be designed to have low sensitivity.

An optical device according to various embodiments of the disclosure may reduce degradation of image sensors, which occurs when moving images are taken for a long time, as a result of arrangement of image sensors, which are at least partially disposed on the exterior, and position design of heat-radiating structures.

A lens assembly according to various embodiments of the disclosure has good optical characteristics such that the same may be easily mounted on a compact electronic device and may obtain high-resolution still images and/or moving images.

A lens assembly according to various embodiments of the disclosure may acquire bright images having wide angled and high resolutions by adjusting the radius of curvature of the refraction surface of each lens and by making the same aspherical.

BRIEF DESCRIPTION OF THE DRAWINGS

FIG. 3A is a perspective view illustrating the coupling structure of the lens assemblies 110, and FIG. 3B is a top view illustrating the coupling structure of the lens assemblies 110.

DETAILED DESCRIPTION

Figure 1:
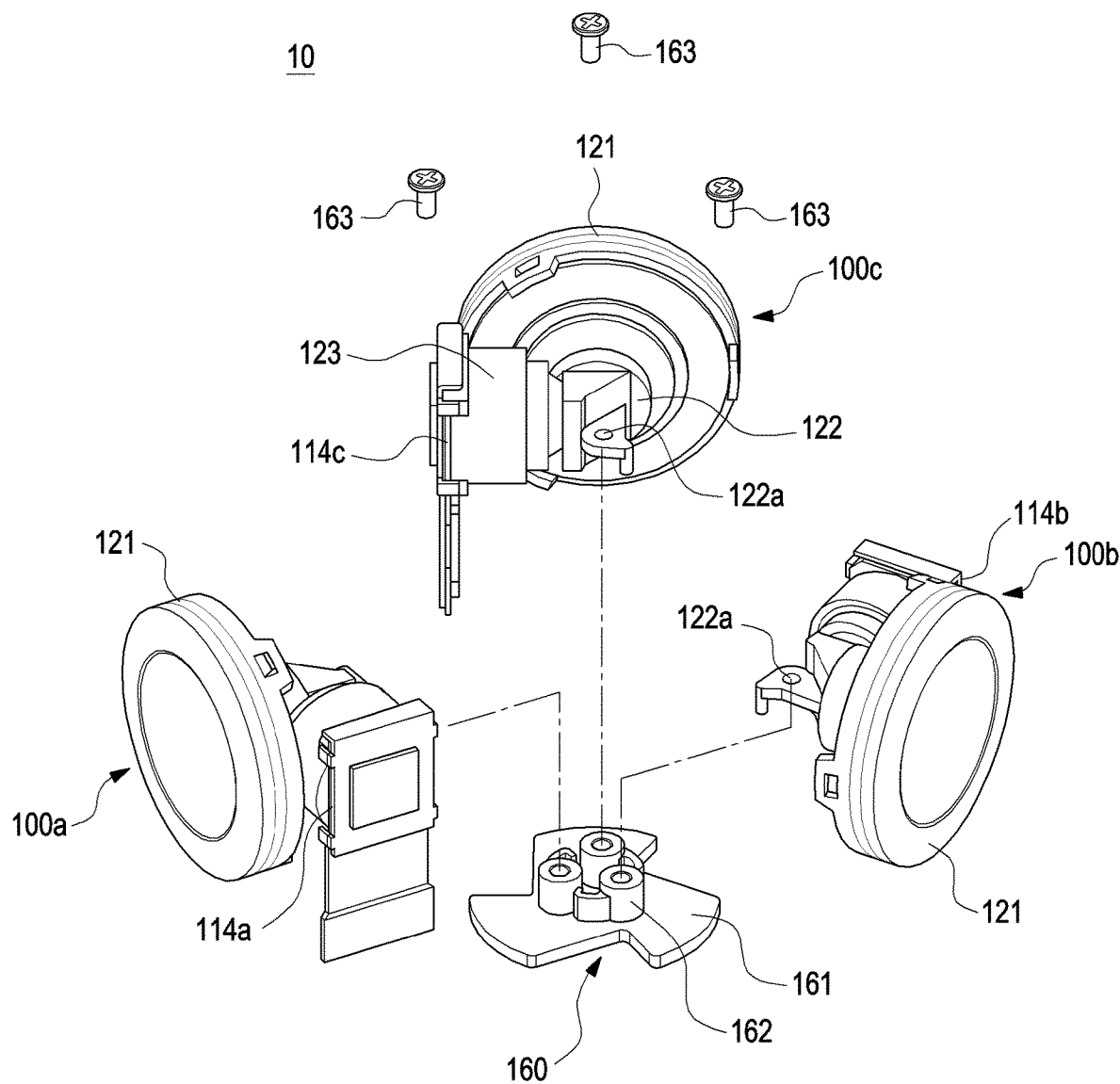
FIG. 1 is an exploded perspective view illustrating a plurality of optical system structures 100 and an optical-axis adjustment structure 160 of an optical device 10 according to various embodiments of the disclosure.

Hereinafter, various embodiments of the disclosure will be described with reference to the accompanying drawings. However, it should be understood that there is no intent to limit the disclosure to the particular forms disclosed herein; rather, the disclosure should be construed to cover various modifications, equivalents, and/or alternatives of embodiments of the disclosure. In describing the drawings, similar reference numerals may be used to designate similar elements.

As used herein, the expression "have", "may have", "include", or "may include" refers to the existence of a corresponding feature (e.g., numeral, function, operation, or constituent element such as component), and does not exclude one or more additional features.

In the disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the disclosure.

It should be understood that when an element (e.g., first element) is referred to as being (operatively or communiatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that may perform the corresponding operations by executing one or more software programs stored in a memory device.

The terms used herein are merely for the purpose of describing particular embodiments and are not intended to limit the scope of other embodiments. A singular expression may include a plural expression unless the context clearly indicates otherwise. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

An electronic device according to various embodiments of the disclosure may include at least one of, for example, a smartphone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), an MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a pair of glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Device, an electronic device for a ship (e.g., a navigation device for a ship and a gyro-compass), avionics, security devices, an automotive head unit, a robot for home or industry, an automatic teller's machine (ATM) in banks, point of sales (POS) in a shop, or an internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. According to some embodiments, the electronic device may also be a flexible device. Further, the electronic device according to an embodiment of the disclosure is not limited to the aforementioned devices, and may include a new electronic device according to the development of technology.

Hereinafter, an electronic device according to various embodiments will be described with reference to the accompanying drawings. In the disclosure, the term "user" may indicate a person using an electronic device or a device (e.g., an artificial intelligence electronic device) using an electronic device.

Figure 2:
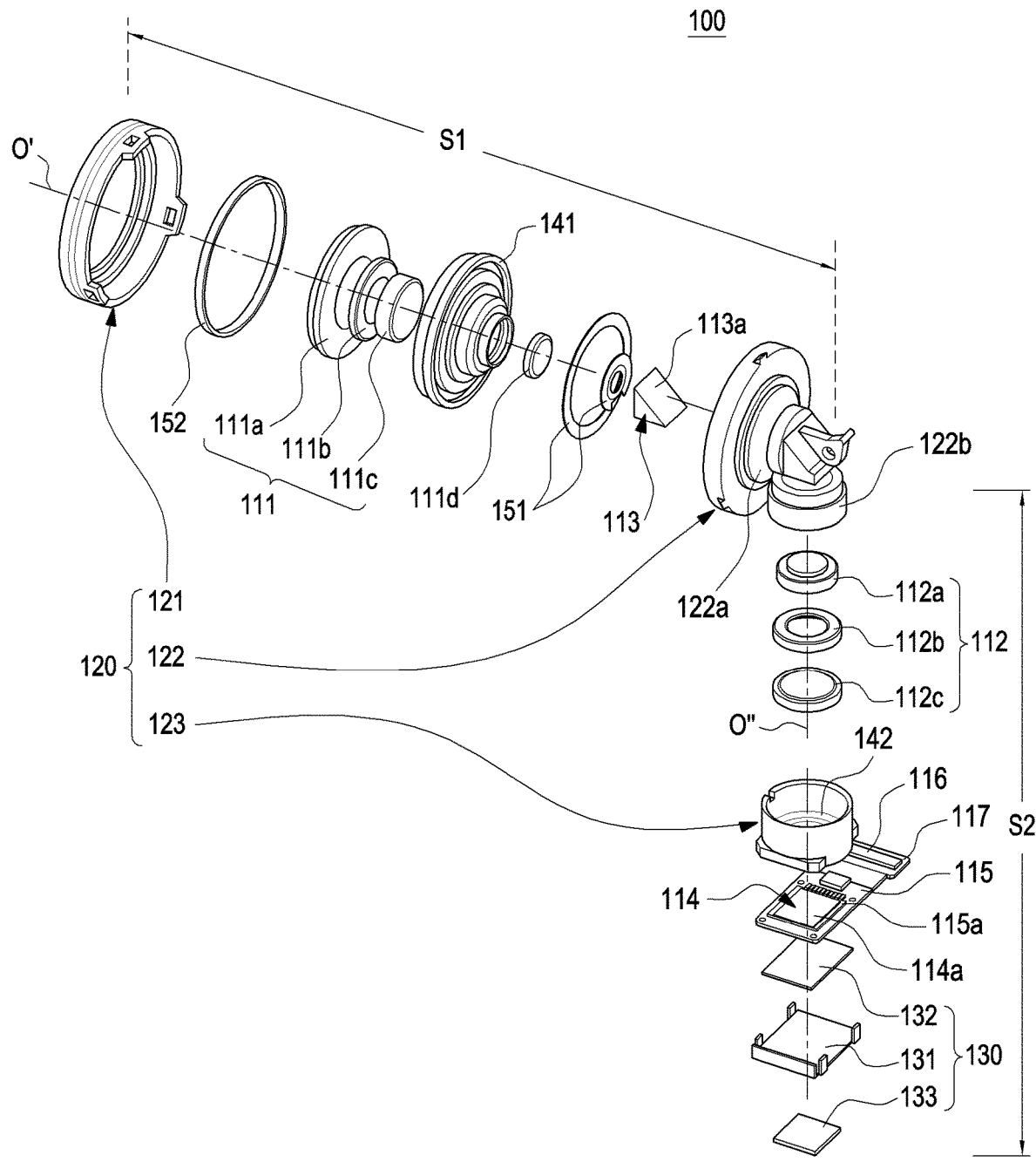
FIG. 2 is an exploded perspective view illustrating a lens assembly 100 according to one of various embodiments of the disclosure.

FIG. 1 is an exploded perspective view illustrating a plurality of optical system structures 100 and an optical-axis adjustment structure 160 of an optical device 10 according to various embodiments of the disclosure. FIG. 2 is an exploded perspective view illustrating respective components of an optical system structure 100 according to one of various embodiments of the disclosure.

Referring to FIG. 1, the optical device 10 may include a plurality of optical system structures 100 disposed adjacent to each other for the purpose of omnidirectional imaging. For example, at least three optical system structures 100 may be configured, and each of the optical system structures 100a, 100b, and 100c may include a lens assembly having a view angle of 120 to 180° such that a 360° imaging device may be configured.

According to various embodiments, the optical system structures 100 constituting the optical device 10 may include a first optical system structure 100a, a second optical system structure 100b disposed adjacent to the first optical system structure 100a, and a third optical system structure 100c disposed adjacent to the second optical system structure 100b. Each of the optical system structures 100a, 100b, and 100c constituting the optical device 10 may be identical to the optical system structure 100 of FIG. 1.

In the center areas of the three optical system structures 100a, 100b, and 100c, optical-axis adjustment structures 160 may be disposed so as to compensate for the amount of rotational error of image sensors 114a, 114b, and 114c disposed on respective optical system structures 100a, 100b, and 100c.

Referring to FIG. 2, the optical device (the optical device 10 of FIG. 1) according to one of various embodiments of the disclosure may include at least one optical system structure 100 having a lens assembly 110 disposed thereon.

According to various embodiments, respective optical system structures 100a, 100b, and 100c of the plurality of optical system structures 100 may include a first lens group 11 including a plurality of lenses 111a, 111b, 111c, and 111d having the same optical axis O', a second lens group 112 including a plurality of lenses 112a, 112b, and 112c having an optical axis O" identical to or different from that of the first lens group 111, and a refraction structure 113 disposed on the path of light of the first lens group 111 and the second lens group 112.

According to various embodiments, the first lens group 111 may include a plurality of lenses 111a, 111b, 111c, and 111d, and the first area S1 of each optical system structure 100 may include a case 120 covering the first lens group 111 and a first seating portion 141 supporting the first lens group 111 disposed inside the case 120.

According to various embodiments, the first lens group 111 may include a plurality of lenses 111a, 111b, 111c, and 111d having the same optical axis O'. For example, the plurality of lenses 111a, 111b, 111c, and 111d may include a first lens 111a, a second lens 111b, a third lens 111c, and a fourth lens 111d successively arranged from near the subject so as to face the refraction structure 113. The first to fourth lenses 111a, 111b, 111c, and 111d may include plastic lenses, respectively, and may be disposed to be optical-axis-aligned with one surface of the refraction structure 113 so as to form a single optical axis O' of the lens assembly 110. The refraction structure 113 may be disposed to be optical-axis-aligned with the first lens group 111 and/or the image sensor 114.

In various embodiments, the first lens group 111 may have positive refractive power or negative refractive power. The plurality of lenses of the first lens group 111 may include a plurality of lenses having negative refractive power and at least one lens having positive refractive power, disposed successively from near the subject. For example, the first lens 111a constituting the first lens group 111 may have negative refractive power, the second lens 111b may have negative refractive power, the third lens 111c may have negative refractive power, and the fourth lens 111d may have positive refractive power.

When parallel light is incident onto a lens having negative refractive power, the light may diffuse after passing through the lens. For example, the lens having negative refractive power may be a lens based on the principle of a concave lens. In contrast, when parallel light is incident onto a lens having positive refractive power, the light may concentrate after passing through the lens. For example, the lens having positive refractive power may be a lens based on the principle of a convex lens.

The smaller the interval (for example, air interval) between each of the first to fourth lenses 111a, 111b, 111c, and 111d and another lens adjacent thereto, the smaller the total length of the lens assembly 110 may become. According to various embodiments, the interval between lenses may be variously designed according to optical characteristics (for example, aberration characteristics, wide-angle characteristics, and/or brightness characteristics) required for the lens assembly 110.

According to various embodiments, the lens assembly 110 may include a diaphragm (not illustrated) disposed on a surface of the first lens 111a that faces the subject. The amount of light reaching the image-forming surface 114a of the image sensor 114 may be adjusted by adjusting the size of the diaphragm.

According to various embodiments, the refraction structure 113 may be disposed between the first lens group 111 and the second lens group 112 so as to bend the optical axis O' of the first lens 111 and to provide the same to the second lens group 112. For example, the refraction structure 113 may bend the optical direction of the first lens group 111 perpendicularly and to transfer the same to the second lens group 112. The optical axis O' of the first lens group 111 and the optical axis O" of the second lens group 111 may be perpendicular to each other. According to an embodiment, by providing a refraction structure 113 having a refraction surface 113a, it is possible to efficiently arrange a mounting space in which the second lens group 112 is disposed, thereby implementing a slim optical system structure 100.

According to various embodiments, the second lens group 112 may include a plurality of lenses 112a, 112b, and 112c, and the second area S2 of the optical system structure 100 may include a case 120 covering the second lens group 112 and a second seating portion 142 supporting the second lens group 112 disposed inside the case 120.

According to various embodiments, the second lens group 112 may include a plurality of lenses 112a, 112b, and 112c having the same optical axis O". For example, the plurality of lenses 112a, 112b, and 112c may include a fifth lens 112a, a sixth lens 112b, and a seventh lens 112c successively arranged from the refraction structure 113 so as to face the image sensor 114. The fifth to seventh lenses 112a, 112b, and 112c may include plastic lenses, respectively, and may be disposed to be optical-axis-aligned with one surface of the refraction structure 113 so as to form one optical axis O" of the lens assembly 110. The refraction structure 113 may be disposed to be optical-axis-aligned with the second lens group 112 and the image sensor 114.

In various embodiments, the second lens group 112 may have positive refractive power. The plurality of lenses of the second lens group 112 may include at least one lens having positive refractive power and/or at least one lens having negative refractive power which are successively disposed from near the refraction structure 113. When parallel light is incident onto a lens having negative refractive power, the light may diffuse after passing through the lens. For example, the lens having negative refractive power may be a lens based on the principle of a concave lens. In contrast, when parallel light is incident onto a lens having positive refractive power, the light may concentrate after passing through the lens. For example, the lens having positive refractive power may be a lens based on the principle of a convex lens.

The smaller the interval (for example, air interval) between each of the fifth to seventh lenses 112a, 112b, and 112c and another lens adjacent thereto, the smaller the total length of the lens assembly 110 may become. According to various embodiments, the interval between lenses may be variously designed according to optical characteristics (for example, aberration characteristics, wide-angle characteristics, and/or brightness characteristics) required for the lens assembly 110.

According to various embodiments, in order to align and support the first lens group 111 of the optical system structure 100, the first area S1 of the optical system structure 100 may include a case 120 covering the first lens group 111 and a first seating portion 141 supporting the first lens group 111 disposed inside the case 120. The case 120 constituting the first area S1 of the optical system structure 100 may include a front case 121 and a first part 122a of a middle case 122.

According to various embodiments, the front case 121 may have front surface on which an opening is formed, and the outermost lens (for example, the first lens 111a) of the first lens group 111 may be mounted so as to form at least a part of the front surface such that the opening formed in the front surface of the front case 121 is closed. The front case 121 is for the purpose of containing the first lens group 111 and the like, and at least a part thereof may be made of a conductive material and/or a plastic material. For example, the front case 121 may include side walls that form the outer surface of the optical system structure 100, and a part of the front case 121 exposed to the exterior of the optical device may be made of a conductive metal material and/or a plastic material.

According to various embodiments, the first part 122a of the middle case 122 may have front surface on which an opening is formed, and may be coupled to the front case 121 so as to provide an area in which the first lens group 111 and the refraction structure 113 are contained. The middle case 122 may include a second part 122b extending from the first part 122a so as to contain the second lens group 112. The first part 122a and the second part 122b may be open toward different directions so as to contain respective lens groups 111 and 112. For example, the center axis of the first part 122a and the center axis of the second part 122b may be disposed perpendicularly to each other. The first part 122a of the middle case 122 may have a recess formed therein in a shape corresponding to that of the refraction structure 113 such that the refraction structure 113 is seated therein.

According to various embodiments, the first seating portion 141 disposed inside the case 120 may include recesses having different sizes such that the plurality of lenses 111a, 111b, 111c, and 111d constituting the first lens group 111 may be supported and seated therein. The recesses formed in the first seating portion 141 may be fabricated in the shape of circular grooves corresponding to the size of the lenses 111a, 111b, 111c, and 111d. For example, recesses formed in the first seating portion 141 may include a recess having a front surface formed in a shape corresponding to that of the first lens 111a (for example, the largest recess among the first lens group 111) and a recess having a rear surface formed in a shape corresponding to that of the fourth lens 111d (for example, the smallest recess among the first lens group 111). The first seating portion 141 may be inserted and fixed to the opening of the front case 121 corresponding to the shape of the first seating portion 141 and/or the first part 122a of the middle case 122.

According to various embodiments, the first area S1 of the optical system structure 100 may include a support member 151 disposed inside the case 200 so as to additionally support the first seating portion 141 and a sealing member 152 configured to prevent infiltration of external alien substances. The support member 151 may be disposed between the first seating portion 141 and the middle case 122 such that the first seating portion 141 is forced against and supported by the middle case 122, and may be fabricated to form a gap between the fourth lens 111d and the refraction structure 113. The sealing member 152 may be disposed in an area near the opening of the front case 121 such that the first lens 111a, which is exposed to the outside, and the front case 121 are forced against each other. The support member 151 and the sealing member 152 may include elastic materials.

According to various embodiments, in order to align and support the second lens group 1112 of the optical system structure 100, the second area S2 of the optical system structure 100 may include a case 200 configured to cover the second lens group 112 and a second seating portion 142 configured to support the second lens group 112 disposed inside the case 200. The case 200 constituting the second area S2 of the optical system structure 100 may include a second part 122b of the middle case 122 and a rear case 123.

According to various embodiments, one surface of the second part 122b of the middle case 122 (for example, one surface facing the second lens group 112) may be open, and the same may be coupled to the rear case 123 so as to provide an area in which the second lens group 112 is contained. The center axis of the second part 122b of the middle case 122 and the center axis of the first part 122a thereof may be disposed perpendicularly to each other.

According to various embodiments, the rear case 123 may have front surface on which an opening is formed and, after the second lens group 112 is seated, the same may be coupled to the second part 122b of the middle case 122, thereby closing the opening formed in the front surface. The rear case 123 is for the purpose of containing the second lens group 112 and the like, and at least a part thereof may be made of a conductive material and/or a plastic material. For example, the rear case 123 may include side walls that form the outer surface of the optical system structure 100, and a part of the rear case exposed to the exterior of the optical device may be made of a conductive metal material and/or a plastic material.

According to various embodiments, the rear case 123 may have an open front surface and, after the second lens group 112 is seated, the same may be coupled to the second part 122b of the middle case 122, thereby closing the open front surface. The rear case 123 is for the purpose of containing the second lens group 112 and the like, and at least a part thereof may be made of a conductive material and/or a plastic material. For example, the rear case 123 may include side walls that form the outer surface of the optical system structure 100, and a part of the rear case exposed to the exterior of the optical device may be made of a conductive metal material and/or a plastic material.

According to various embodiments, the second seating portion 142 integrally formed inside the rear case 123 may include recesses having different sizes such that the plurality of lenses constituting the second lens group 112 may be supported and seated therein. The recesses formed on the second seating portion 142 may be fabricated in the shape of circular grooves corresponding to the size of the lenses 112a, 112b, and 112c.

According to various embodiments, the optical system structure 100 may include an image sensor 114 disposed to face the second lens group 112. For example, the optical system structure 100 may have a rear case 123 disposed above a printed circuit board 115 including an opening 115a, and the rear case 123 may have the shape of a cylindrical bracket so as to contain the second lens group 112.

According to various embodiments, the image sensor 114 may be contained and seated in the opening 115a of the printed circuit board 115. The opening 115a of the printed circuit board 115 may further include an image sensor carrier (not illustrated) such that the image sensor 114 is contained in and supported by the printed circuit board 115. Since no separate component is necessary to contain the image sensor 114 in the printed circuit board 115, not only may the product manufacturing cost be lowered, but the thickness of the product may also be reduced, thereby making the product compact or slim.

According to various embodiments, various components necessary to drive the camera lenses and to store images may be mounted outside the image sensor 114 seated in the opening 115a of the printed circuit board 115. The components may include, for example, a flash memory, a gyro sensor, and an OIS-driver IC. The components may be surrounded by a shield may (not illustrated) made of a metal material.

According to an embodiment of the disclosure, a connector 116 may be provided outside the image sensor 114 seated in the opening 115a of the printed circuit board 115 and connected to another component of the electronic device 10, and a conductive tape 117 may be disposed beneath the connector 116.

Figure 6:
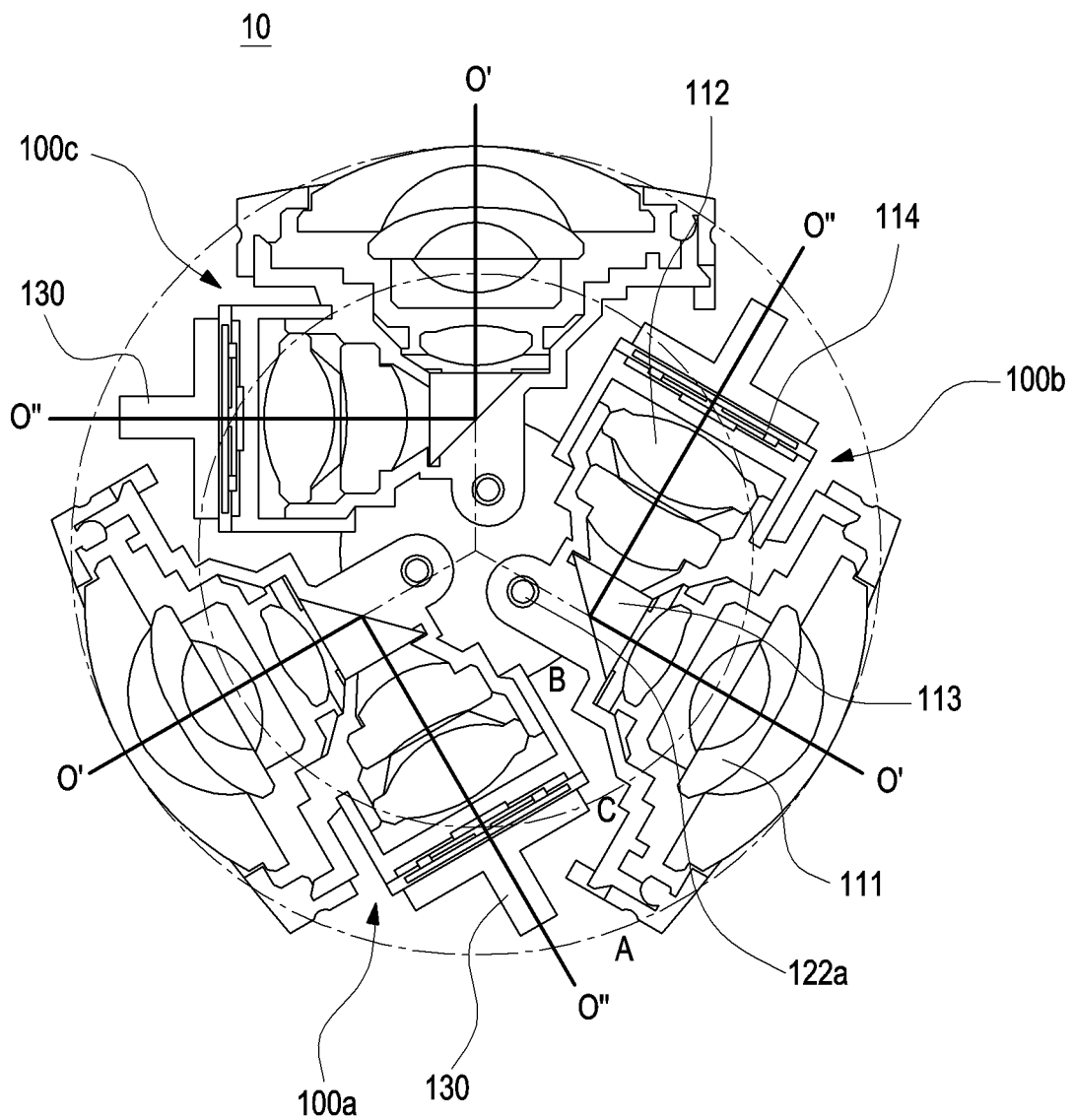
FIG. 6 is a sectional view illustrating the arrangement relationship of optical system structures 100 according to various embodiments of the disclosure.

According to various embodiments, the optical system structure 100 may include a heat-radiating structure 130 disposed to face the image sensor 114. Referring to FIG. 6, when seen from above the optical system structure 100, the heat-radiating structure 130 may be disposed between circle A and circle C. The heat-radiating structure 130 may include a first heat-radiating material 132 and a second heat-radiating material 132 disposed with a plate 131 interposed therebetween, and may radiate heat moving from the heat source of the printed circuit board 115 and/or the image sensor 114. For example, the heat source of the printed circuit board 115 may be at least one chip disposed on the printed circuit board 115, and may include a PMIC, a PAM, an AP, and a CP.

According to various embodiments, the first heat-radiating material 132 and the second heat-radiating material 132 may include, for example, a heat pipe, a solid-state heat-radiating sheet, or liquid-state heat-radiating paint. The heat pipe, the solid-state heat-radiating sheet, or the liquid-state heat-radiating paint may be made of a material having high thermal conductivity, such as graphite, carbon nanotubes, a natural regenerated material, silicone, and silicon.

According to various embodiments, the first heat-radiating material 132 may be disposed to face the printed circuit board 115 with a predetermined gap therebetween, and the first heat-radiating material 131 and/or the second heat-radiating material 132 may be disposed to contact the plate 131. A planar gap layer including a gap may be disposed between the first heat-radiating material 131 and the printed circuit board 115 such that heat diffused from the heat source is diffused to the first heat-radiating material 131 through the gap layer, distributed over the entire surface of the plate 131 and/or the second heat-radiating material 133, and then diffused to the outside. As another example, the plate may include a metal material, such as Al or Mg. The metal material has a heat-diffusing performance and thus enables additional distribution of heat.

Referring to FIG. 1 again, the optical system structure 100 according to various embodiments may include an optical-axis adjustment structure 160, and the optical-axis adjustment structure 160 may include a single plate 161 and a plurality of groove portions 162 formed on a surface of the plate 161. The centers of the groove portions 162 may be disposed to correspond to the center of a groove 112a formed to protrude outward from the middle case 122 of each optical system structure 100. For example, the center of the single groove 122a and the center of each groove portion 162 may be disposed on the same line, and the grooves 122a and/or the groove portions 162a may be disposed such that a virtual line connecting the centers of the grooves 122a and a virtual line connecting the centers of the groove portions 162 form a regular triangle (having an internal angle of 120°).

According to various embodiments, the grooves 122a on the outside the middle case 122 and the grooves portions 162 of the optical-axis adjustment structure 160 may be aligned with each other and then fastened to each other by coupling members 163 such as screws. The fastening process may be adjusted to compensate for the amount of rotational error of respective image sensors.

According to various embodiments, the optical-axis adjustment device 160 may be disposed to form a single axis on the optical axes of the first lens groups 111 of respective optical system structures 100a, 100b, and 100c. As another example, the image sensors 114 may be configured in rectangular shapes, and the long sides of the image-forming surfaces of the image sensors 114a, 114b, and 114c may be disposed perpendicularly to a plane defined by three optical axes of the first lens groups 111 or the second lens groups 112 of respective optical system structures 100a, 100b, and 100c.

Figure 3:
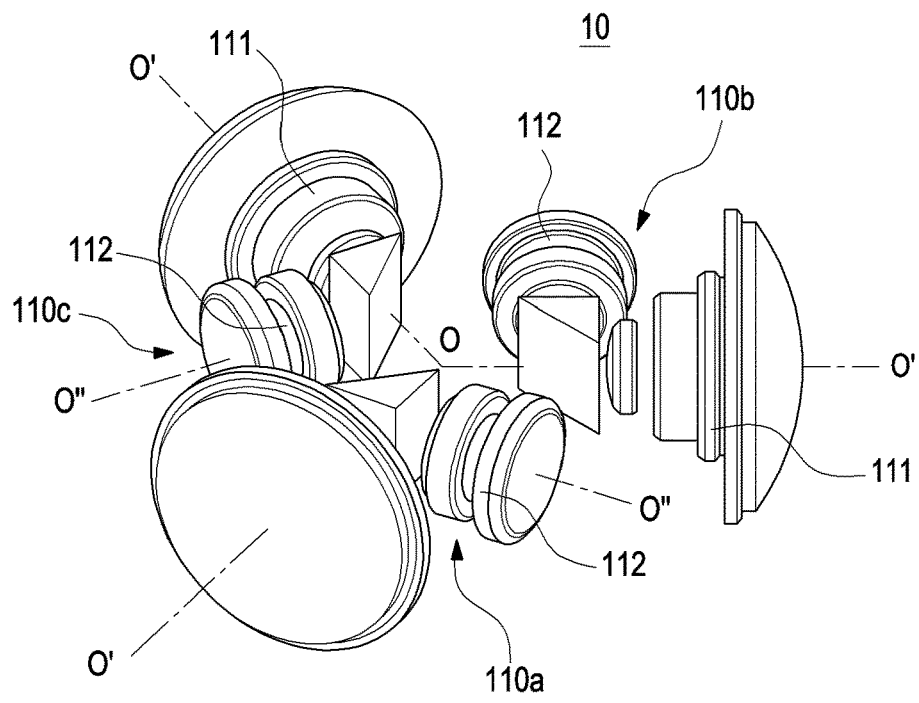
FIG. 3A and FIG. 3B are diagrams illustrating an optical device 10 including a plurality of lens assemblies 100 according to various embodiments of the disclosure.
Figure 3:
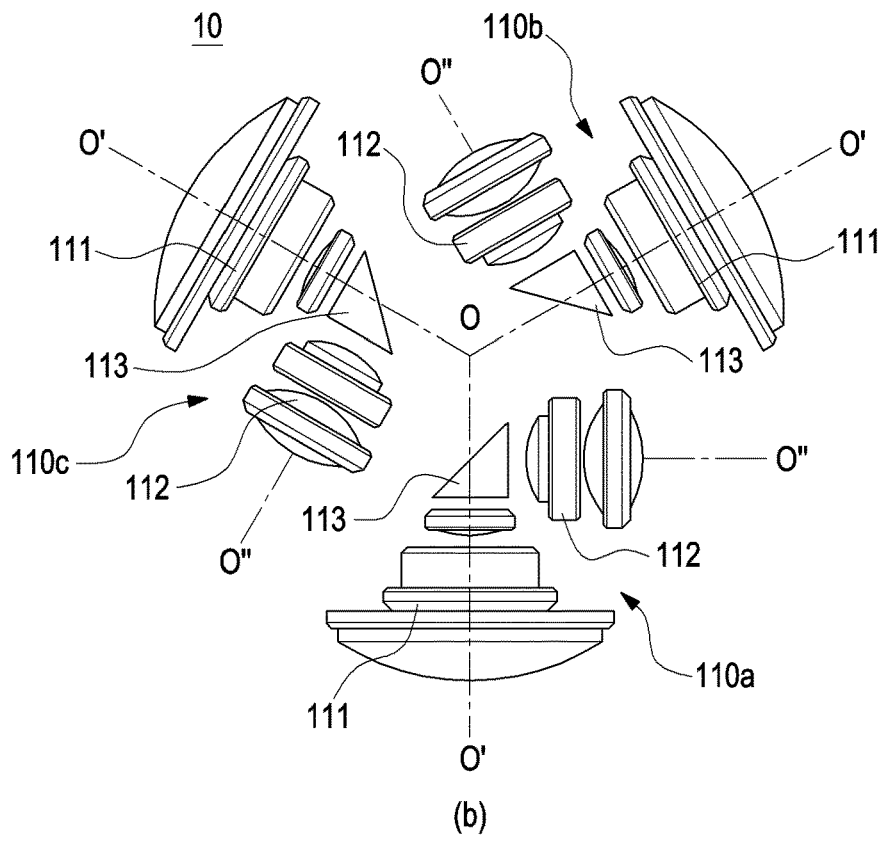

FIG. 3 is a diagram illustrating a relationship of arrangement of a plurality of lens assemblies 110 according to various embodiments of the disclosure. FIG. 3A is a perspective view illustrating the coupling structure of the lens assemblies 110, and FIG. 3B is a top view illustrating the coupling structure of the lens assemblies 110.

The lens assembly 110 structure illustrated in FIG. 3A and FIG. 3B may be identical to part or all of the optical system structure 100 including a lens assembly 110 illustrated in FIG. 1 or FIG. 2.

Referring to FIG. 3A and FIG. 3B, the optical device (for example, the optical device 10 of FIG. 1) may include a plurality of optical system structures (for example, the optical system structures 100 of FIG. 2) disposed adjacent to each other for the purpose of omnidirectional imaging. For example, at least three optical system structures 100 may be configured, and respective optical system structures 100a, 100b, and 100c may include lens assemblies 110a, 110b, and 110c therein, which have a view angle of 120 to 180°, such that a 360° imaging device may be configured.

According to various embodiments, the lens assembly structures 110 constituting the optical device 10 may include a first lens assembly 110a, a second lens assembly 110b disposed adjacent to the first lens assembly 110a, and a third lens assembly 110c disposed adjacent to the second lens assembly 110b.

According to various embodiments, when respective first lens groups 111 disposed inside the plurality of lens assemblies 110a, 110b, and 110c are seen from above, the optical axes O' of the first lens groups 111 may be disposed to face different directions. For example, the optical axes O' of respective first lens groups 111 of the three lens assemblies 110a, 110b, and 110c may be disposed on the same plane, and the angle between each optical axis O' and an adjacent optical axis O', which meet at a single point O, may be configured to be 120°.

According to an embodiment of the disclosure, when a lens assembly having a view angle of 120° to 180° or larger is disposed, transverse images that do not use ultra-peripheral images may undergo degradation of peripheral image quality, and the center/periphery image discrepancy may decrease as a result.

According to various embodiments, when the second lens groups 112 disposed inside the plurality of lens assemblies 110a, 110b, and 110c are seen from above, the optical axes O″ of the second lens groups 112 may be disposed to face different directions. For example, the optical axis O′ of each first lens group 111 and the optical axis O″ of the second lens group 112 of an adjacent optical system structure may be configured to define an angle of 30° therebetween. Details thereof will be described later with reference to FIG. 5 and FIG. 6. As another example, image sensors (not illustrated) may be disposed on one surface of the second lens groups 112 so as to face different directions and may not be disposed adjacent to each other. Accordingly, heating parts of the image sensors are not disposed to face each other at a short distance, and this may be advantageous in terms of performance degradation due to heating and recording time limitations.

Figure 4:
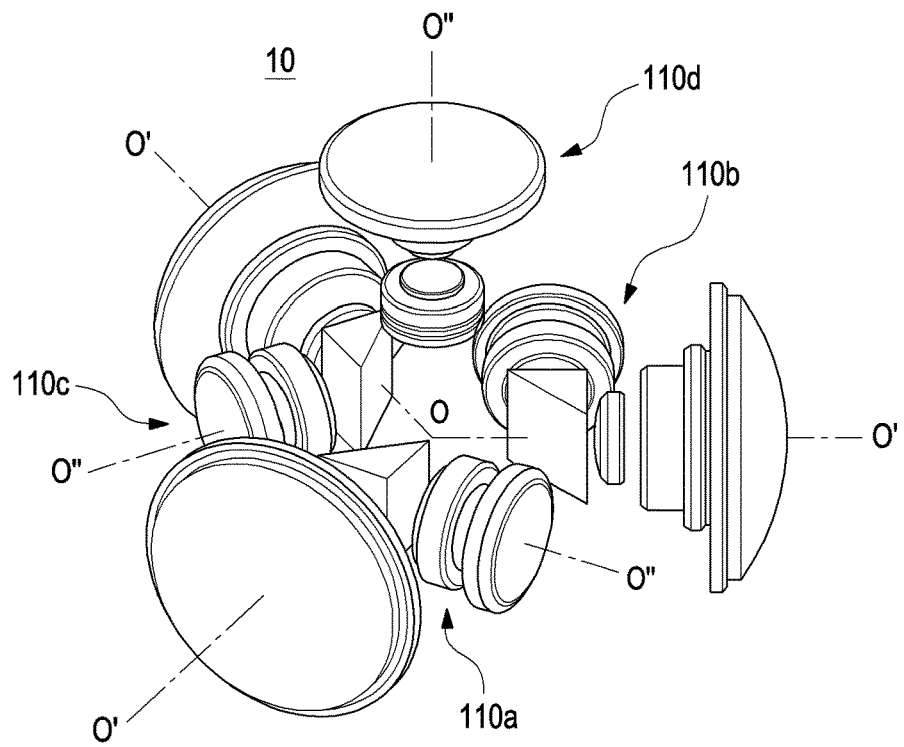
FIG. 4A and FIG. 4B are diagrams illustrating an optical device including a plurality of lens assemblies 110 according to various embodiments of the disclosure.
Figure 4:
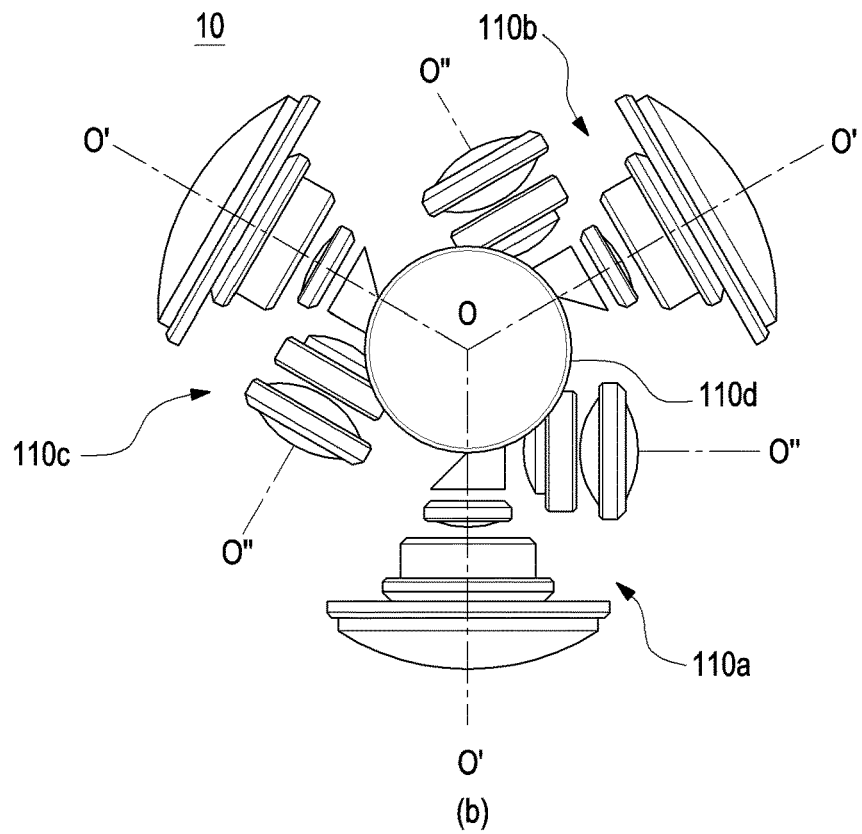

FIG. 4 is a diagram illustrating an optical device including a plurality of lens assemblies 110 according to various embodiments of the disclosure. FIG. 4A is a perspective view illustrating the coupling structure of four lens assemblies 110, and FIG. 4B is an upper view illustrating the coupling structure of the four lens assemblies 110.

The lens assembly 110 structure illustrated in FIG. 4A and FIG. 4B may be identical to part or all of the optical system structure 100 including a lens assembly 110 illustrated in FIG. 3.

Referring to FIG. 4A and FIG. 4B, the optical device 10 may include a plurality of optical system structures 100 disposed adjacent to each other for the purpose of omnidirectional imaging. For example, at least four lens assemblies 110 may be configured, and each of the three lens assemblies 110a, 110b, and 110c disposed on the same plane may be configured as an optical system having a view angle of 120° to 180° such that a 360° imaging device may be configured. As another example, a fourth lens assembly 110d may be disposed above or below the three lens assemblies 110a, 110b, and 110c.

According to various embodiments, the lens assemblies 110 constituting the optical device may include a first lens assembly 110a, a second lens assembly 110b disposed adjacent to the first lens assembly 110a, and a third lens assembly 110c disposed adjacent to the second lens assembly 110b. The fourth lens assembly 110d may have an optical axis O‴ formed perpendicularly to the center O of the optical axes O′ of the first to third lens assemblies 110a, 110b, and 110c. For example, the optical axis O‴ of the first lens group 111 of the fourth lens assembly 110d may exist on the single point O, at which the optical axes O′ of the first lens groups 111 of the first to third lens assemblies 110a, 110b, and 110c meet, and on a straight line extending through the single point while being perpendicular to the horizontal plane. The first to third lens assemblies 110a, 110b, and 110c constituting the optical device 10 may be identical to the lens assemblies 110 of FIG. 3, and the fourth optical system structure 110d of FIG. 4 may be identical to the structure of the first lens group 111 of the lens assemblies of FIG. 3 and the structure of the second lens groups 112 thereof, but may not include the refraction structure 113.

According to an embodiment of the disclosure, a single fourth lens assembly 110d may be configured and disposed above the first to third lens assemblies 110a, 110b, and 110c such that the first lens group 111 thereof faces forward, but is not limited thereto, and may be additionally disposed below the same so as to face rearward. The arrangement of the first lens group 111 and the second lens group 112 is identical to that illustrated in FIG. 3, and repeated description thereof will be omitted herein.

Figure 5:
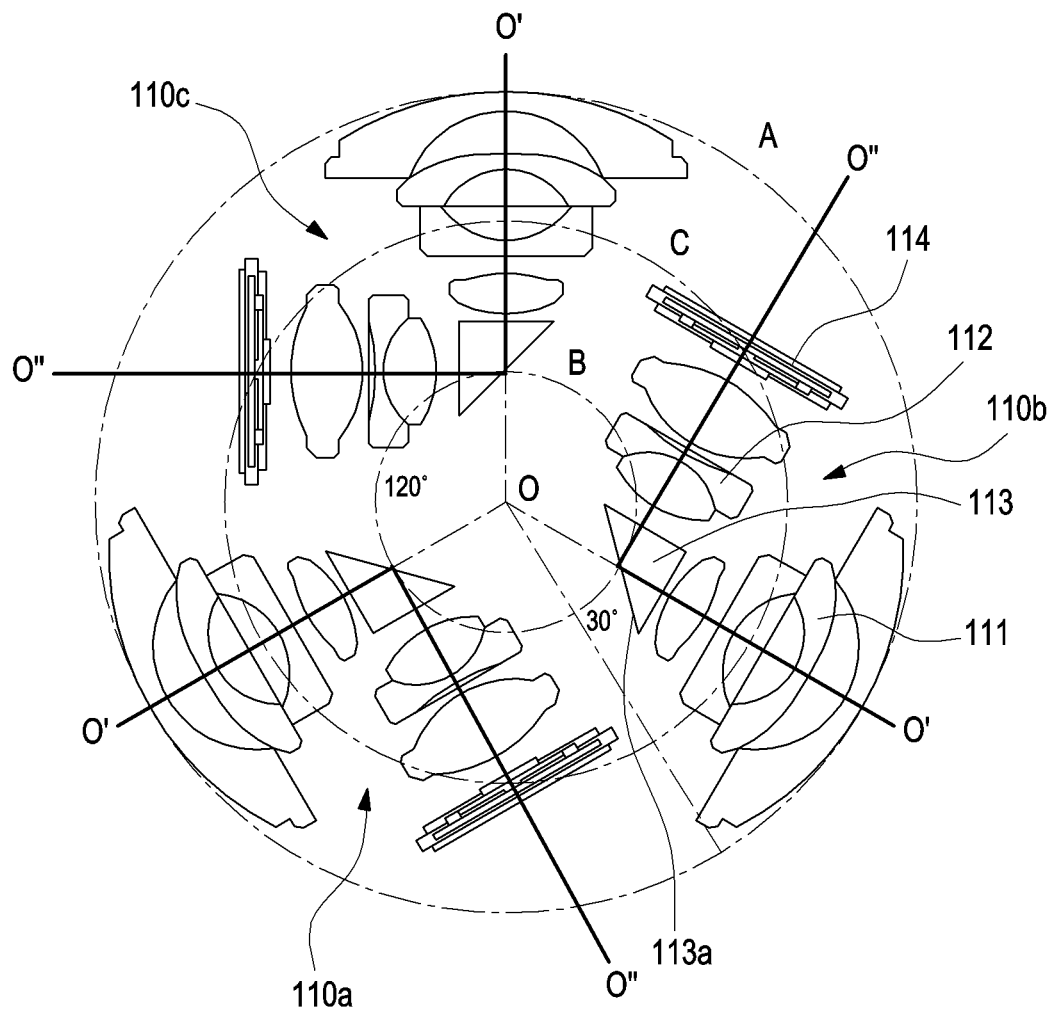
FIG. 5 is a sectional view illustrating the arrangement structure of lens assemblies 110 according to various embodiments of the disclosure.

FIG. 5 is a sectional view illustrating the arrangement structure of lens assemblies 110 according to various embodiments of the disclosure. FIG. 6 is a sectional view illustrating the arrangement relationship of optical system structures 100 according to various embodiments of the disclosure.

The lens assemblies 110 and the optical system structures 100 illustrated in FIG. 5 and FIG. 6 may be identical to part or all of the optical system structures 100 including lens assemblies 110 illustrated in FIG. 1 to FIG. 4.

Referring to FIG. 5 and FIG. 6, the optical device according to one of various embodiments of the disclosure may include a plurality of optical system structures 100 having at least one lens assembly 110 disposed thereon. According to various embodiments, the lens assemblies 110a, 110b, and 110c inside respective optical system structures 100a, 100b, and 100c of the plurality of optical system structures 100 may include a first lens group 111 including a plurality of lenses having the same optical axis O′, a second lens group 112 including a plurality of lenses having an optical axis O″ identical to or different from that of the first lens group 111, and a refraction structure 113 disposed between the first lens group 111 and the second lens group 112.

According to various embodiments, the lens assemblies 110 may include a first lens assembly 110a, a second lens assembly 110b disposed adjacent to the first lens assembly 110a, and a third lens assembly 110c disposed adjacent to the second lens assembly 110b. Respective lens assembly structures 110a, 110b, and 110c constituting the optical system structures 100a, 100b, and 100c may be identical to part or all of the lens assembly structures of FIG. 1.

According to various embodiments, the first lens group 111 disposed on each of the first lens assembly to the third lens assemblies 110a, 110b, and 110c may have positive refractive power or negative refractive power, and the second lens group 112 may have positive refractive power.

Referring to FIG. 5, circle A may be defined to have radius a connecting apexes of the outermost lenses of respective first lens groups 111 (for example, the first lenses 111a of FIG. 1); circle B may be defined to have radius b connecting centers of refraction surfaces 113a of respective refraction structures 113; and circle C may be defined to have radius c connecting centers of upper surfaces of respective image sensors. According to the above definition, the structure of lens assemblies may have first lens groups 111, second lens groups 112, and refraction structures 113 disposed inside lens assemblies 110 such that respective circles A, B, and C have radius values a>c>b.

According to various embodiments, on the basis of the above definition, the optical axes O″ of respective second lens groups 112 may be disposed to circumscribe one circle C having a radius corresponding to the distance from the point O, at which the optical axes O′ of the three first lens groups 111 disposed on the same plane meet, to the refraction surfaces 113a of the refraction structures 113.

According to various embodiments, the optical axes O′ of the three first lens groups 111 may be disposed on the same plane, and the angle between each optical axis O′ and an adjacent optical axis O′, which meet at one point O, may be 120°. For example, the optical axis O′ of the first lens group 111 of the first lens assembly 110a, the optical axis O′ of the first lens group 111 of the second lens assembly 110b, and the optical axis O′ of the first lens group 111 of the third lens assembly 110c may be disposed on the same plane, and may intersect at a single intersection point O. The angle between the optical axis O′ of the first lens group 111 of the first lens assembly 110a and the optical axis O′ of the first lens group 111 of the second lens assembly 110b may be 120°; the angle between the optical axis O′ of the first lens group 111 of the second lens assembly 110b and the optical axis O' of the first lens group 111 of the third lens assembly 110c may be 120°; and the angle between the optical axis O' of the first lens group I 111 of the third lens assembly 110c and the optical axis O' of the first lens group 111 of the first lens assembly 110a may be 120°.

As another example, the angle between the optical axis O' of each first lens group 111 and the optical axis O" of the second lens group 112 of an adjacent lens assembly structure may be 30°. For example, the angle between the optical axis O' of the first lens group 111 of the first lens assembly 110a and the optical axis O" of the second lens group 112 of the second lens assembly 110b or the optical axis O" of the second lens group 112 of the third lens assembly 110c may be 30°. As another example, the angle between the optical axis O' of the first lens group 11 of the second lens assembly 110b and the optical axis O" of the second lens group 112 of the first lens assembly 110a or the optical axis O" of the second lens group 112 of the third lens assembly 110 may be 30°.

According to various embodiments, the optical system structures 100 may include three image sensors 114 disposed to face the second lens groups 112, respectively. As another example, the optical system structures 100 may include three heat-radiating structures 130 disposed to face the image sensors 114, respectively. When seen from above the optical system structures 100, the heat-radiating structures 130 may be at least partially disposed between circle A and circle C.

According to various embodiments, when images of signals received from respective optical system structures 100 or image sensors 114 are connected or synthesized, a signal from an image sensor may be connected or synthesized with a signal from another image sensor adjacent thereto in the leftward/rightward direction. For example, the left-end area of one image sensor may be connected with the right-end area of an adjacent image sensor, and the right-end area of one image sensor may be connected to the left-end area of an adjacent image sensor.

Figure 7:
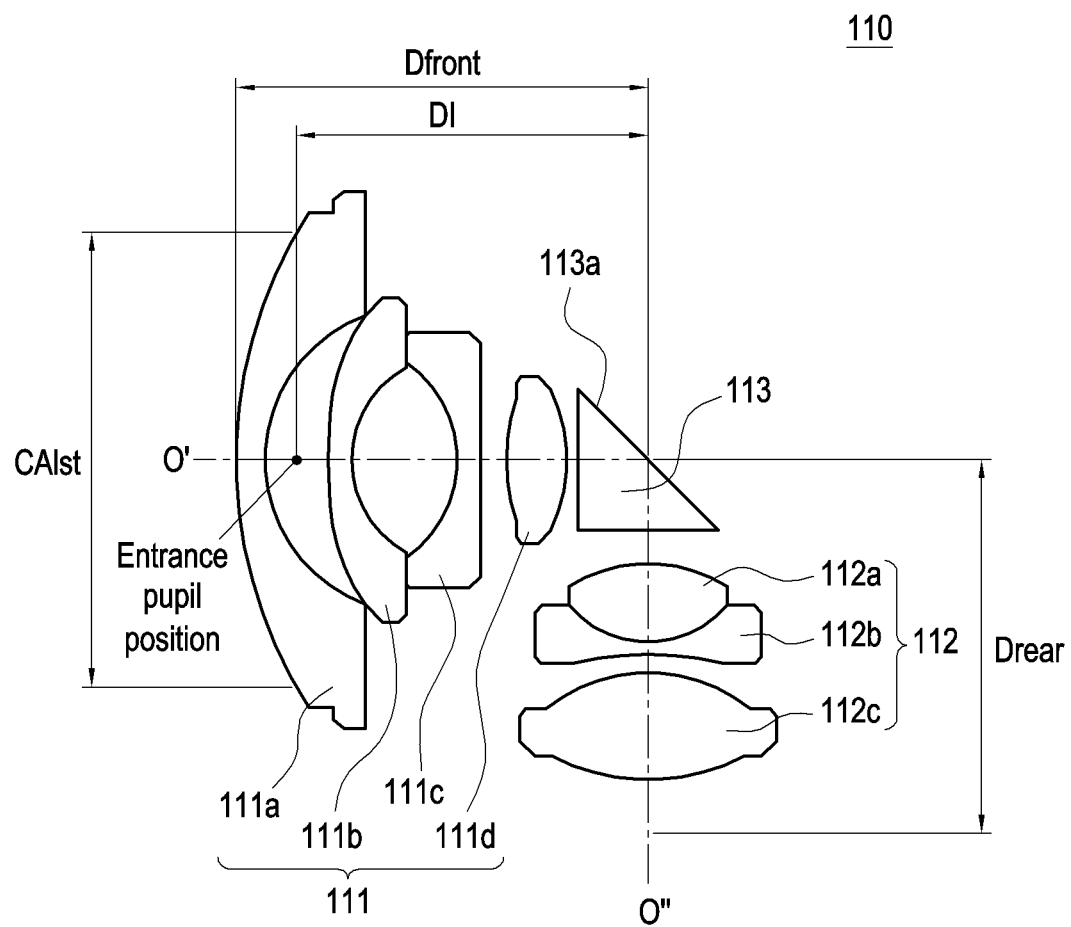
FIG. 7 is a sectional view illustrating the arrangement structure of a lens assembly 110 according to various embodiments of the disclosure.
Figure 8:
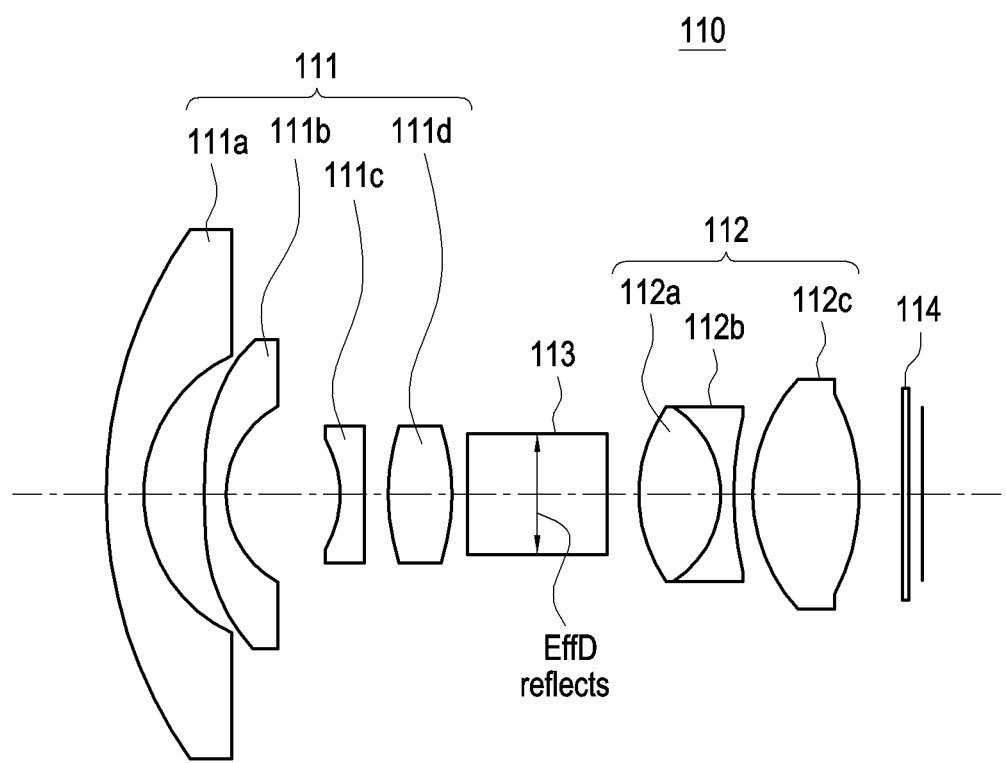
FIG. 8 is a sectional view illustrating structures of the lens assembly 110 of FIG. 7, which are successively arranged along a straight line, according to various embodiments of the disclosure.

FIG. 7 is a sectional view illustrating the arrangement structure of a lens assembly 110 according to various embodiments of the disclosure. FIG. 8 is a sectional view illustrating structures of the lens assembly 110 of FIG. 7, which are successively arranged along a straight line, according to various embodiments.

The lens assembly 110 structure illustrated in FIG. 7 and FIG. 8 may be identical to part or all of the optical system structure 100 including a lens assembly 110 illustrated in FIG. 1 to FIG. 6.

Referring to FIG. 7 and FIG. 8, the optical device according to one of various embodiments of the disclosure may include a plurality of optical system structures 100 having at least one lens assembly 110 disposed thereon.

According to various embodiments, the lens assembly 110 inside respective optical system structures of the plurality of optical system structures may include a first lens group 111 including a plurality of lenses 111a, 111b, 111c, and 111d having the same optical axis O', a second lens group 112 including a plurality of lenses 112a, 112b, and 112c having an optical axis identical to or different from that of the first lens group 111, and a refraction structure 113 disposed between the first lens group 111 and the second lens group 112. The single lens assembly 110 illustrated in FIG. 7 and FIG. 8 may be one of the plurality of lens assemblies of FIG. 5, and the other lens assemblies have the same structure as that of the single lens assembly 110.

According to various embodiments, the single lens assembly 110 may have the first lens group 111, the refraction structure 113, and the second lens group 112 disposed successively from near the subject, and may satisfy following Equation 1, Equation 2, and/or Equation 3 such that the same may be compact and have good optical characteristics.

$$(\text{EffD\_ReflctS}^2)/(F^{*}2Y) < 3.0 \quad \text{[Equation 1]}$$

$$D1/D\text{rear} < 1.0 \quad \text{[Equation 2]}$$

$$5 < D1/F < 10 \quad \text{[Equation 3]}$$

wherein EffD_ReflctS may refer to the effective diameter of the refraction surface 113a of the refraction structure 113; F may refer to the focal distance of the lens assembly; and Y may refer to the image upper-height at the maximum view angle. In addition, D1 may refer to the distance from the entrance pupil of the optical system to the refraction surface 113a of the optical path refraction structure 113, and Drear may refer to the distance from the refraction surface 113a of the optical path refraction structure 113 to the upper surface.

According to an embodiment, when a lens assembly 110 is fabricated in such a range that Equation 1 above is satisfied, increase of the total length and the outer diameter of the first lens group 111 is suppressed, and the size of the refraction structure 113 that bends the optical path is reduced, thereby making it possible to secure good optical characteristics (for example, aberration characteristics, wide-angle characteristics, and/or brightness characteristics) of the lens assembly 110.

According to an embodiment, when a lens assembly 110 is fabricated in such a range that Equation 2 above is satisfied, the size of D1 is limited according to the above equation, thereby increasing the degree of freedom of arrangement of the lens assemblies, and the difference in optical path between the lens assemblies is reduced, thereby making it possible to secure good optical characteristics (for example, aberration characteristics, wide-angle characteristics, and/or brightness characteristics) of the lens assembly 110.

According to an embodiment, when a lens assembly 110 is fabricated in such a range that Equation 3 above is satisfied, it is possible to secure good optical characteristics of the lens assembly 110, which are advantageous for the view angle and sensitivity. For example, if D1/F is adjusted to a value below the lower threshold, the size of D1 may be reduced, but there may be a problem in that aberration correction is difficult with regard to a view angle of 180° or larger, and the sensitivity rises. If D1/F is adjusted to a value above the upper threshold, there may be a problem in that the sensitivity decreases, and the difference in path between the optical systems will increase.

According to various embodiments, the single lens assembly 110 may have the first lens group 111, the refraction structure 113, and the second lens group 112 disposed successively from near the subject, and may satisfy following Equation 4, Equation 5, and/or Equation 6 such that the same may be compact and have good optical characteristics.

$$6 < D\text{rear}/F < 11 \quad \text{[Equation 4]}$$

$$0.9 < D\text{front}/D\text{rear} < 1.4 \quad \text{[Equation 5]}$$

$$0.8 < \sqrt{\{(CA1st/2)^2 + D1^2\}/\{D\text{rear}^2 + Y^2\}} < 1.2 \quad \text{[Equation 6]}$$

wherein F may refer to the focal distance of the entire lens assembly; Dfront may refer to the distance from the object-side apex of the first lens group 111 to the refraction surface 113a of the optical path refraction structure 113; and Drear may refer to the distance from the refraction surface 113a of the optical path refraction structure 113 to the upper surface.

In addition, CA1st may refer to the effective diameter of the subject-side surface of the first lens group 111; D1 may refer to the distance from the entrance pupil of the lens assembly to the refraction surface 113a of the optical path bending structure 113; and Y may refer to the image upper-height at the maximum view angle.

According to an embodiment, when a lens assembly 110 is fabricated in such a range that Equation 4 above is satisfied, it is possible to secure good optical characteristics of the lens assembly 110 that are advantageous for the view angle and sensitivity. For example, if Drear/F is adjusted to a value below the lower threshold, there may be a problem in that a large view angle cannot be maintained, and the sensitivity rises. If Drear/F is adjusted to a value above the upper threshold, the horizontal view angle may be blocked by the second lens group 112 and the image sensor 114.

According to an embodiment, when a lens assembly 110 is fabricated in such a range that Equation 5 above is satisfied, the size of lenses and the parallax of lenses (for example, structure of three lens assemblies) may be optimized, thereby making it possible to secure good optical characteristics of the lens assembly 110. For example, if Drear/Drear is adjusted to a value below the lower threshold, the overall structure size may increase, and the parallax may increase. If Drear/Drear is adjusted to a value above the upper threshold, the lens diameter of the first lens group 111 may increase, and the size of the entire structure and parallax may increase.

According to an embodiment, when a lens assembly 110 is fabricated in such a range that Equation 6 above is satisfied, the size of lenses and the parallax of lenses (for example, structure of three lens assemblies) may be optimized, thereby making it possible to secure good optical characteristics of the lens assembly 110. For example, if sqrt[{(CA1st/2)^2+D1^2}/{Drear^2+Y^2}] is adjusted to a value below the lower threshold, the overall structure size may increase, and the parallax may increase. If sqrt[{(CA1st/2)^2+D1^2}/{Drear^2+Y^2}] is adjusted to a value above the upper threshold, the lens diameter of the first lens group 111 may increase, and the size of the entire structure and parallax may increase. According to various embodiments, the single lens assembly 110 may have the first lens group 111, the refraction structure 113, the second lens group 112, and the image sensor 114 disposed successively from near the subject, and may satisfy following Equation 7 and/or Equation 8 such that the same may be compact and have good optical characteristics.

$$130 < FOV\_hori < 150 \qquad \text{[Equation 7]}$$

$$185 < FOV\_virt < 200 \qquad \text{[Equation 8]}$$

wherein FOV_hori may refer to the view angle of the short-side upper-height of the image sensor 114, and FOV_virt may refer to the view angle of the long-side upper-height of the image sensor 114.

According to an embodiment, when a lens assembly 110 is fabricated in such a range that Equation 7 above is satisfied, it is possible to secure good optical characteristics of the lens assembly 110. For example, the above range of horizontal view angle (FOV_hori) may guarantee that, by arranging three lens assemblies in the horizontal direction, an appropriate blending area is formed.

According to an embodiment, when a lens assembly 110 is fabricated in such a range that Equation 8 above is satisfied, it is possible to secure good optical characteristics of the lens assembly 110. For example, the above range of vertical view angle (FOV_virt) may guarantee that, by arranging three lens assemblies in the vertical direction, the blind spot is removed, thereby securing good optical characteristics.

Figure 9:
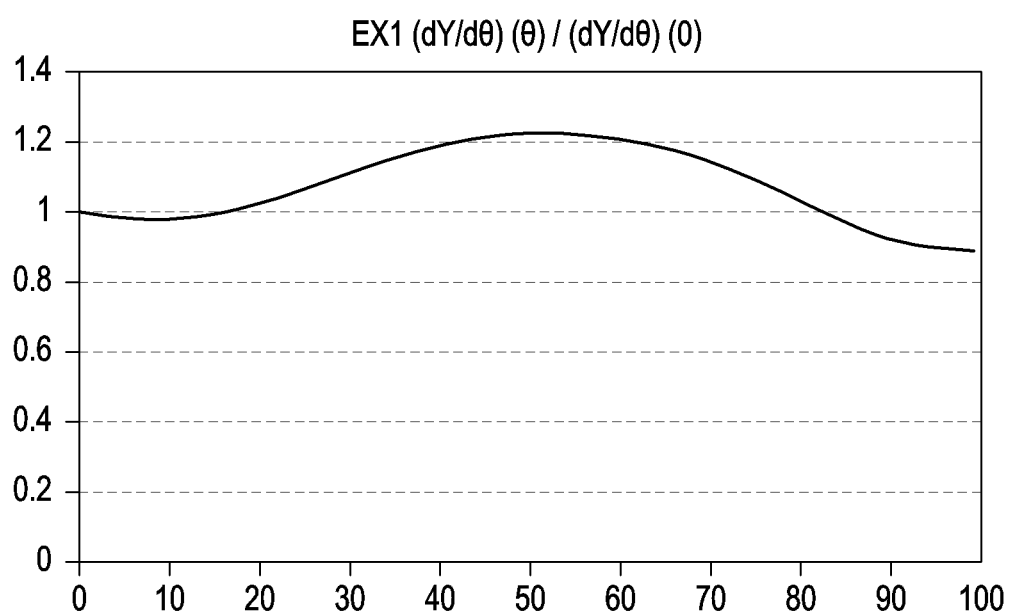
FIG. 9 is a graph illustrating a resolution discrepancy of the lens assembly arrangement structures of FIG. 7 and FIG. 8 according to various embodiments of the disclosure.

FIG. 9 is a graph illustrating a resolution discrepancy of the lens assembly arrangement structure of FIG. 7 and FIG. 8 according to various embodiments of the disclosure.

According to various embodiments, the single lens assembly 110 may have the first lens group 111, the refraction structure 113, the second lens group 112, and the image sensor 114 disposed successively from near the subject, and may satisfy following Equation 9 such that the same may be compact and have good optical characteristics.

$$0.7 < (dY/d\Theta)(\Theta)/(dY/d\Theta)(0) < 1.3 \qquad \text{[Equation 9]}$$

wherein FOV may refer to the maximum view angle, and $dY/d\Theta(\Theta)$ may refer to the first derivative, with regard to $\Theta$, of function $Y=f(\Theta)$ that describes the relationship between the view angle ($\Theta$) and the image height (Y).

Referring to FIG. 9, if $(dY/d\Theta)(\Theta)/(dY/de\Theta)(0)$ satisfies the corresponding range in connection with the mapping function related equation, the area-specific resolution discrepancy may be reduced.

Table 1 below enumerates lens data of the lens assembly 110, and "S1-S20" may refer to the refraction surface 113a of the relevant lens (first lens group 111 and the second lens group 112 and/or the refraction structure 113). The lens assembly 110 may satisfy the above-mentioned condition (and/or at least one of the above-mentioned conditions) while having an f-number of 0.85, a half view-angle of 180°, and a focal distance of 1.95 mm.

TABLE 1

| surface | radius | Thick | Ind | Abv | Effec. Semi-Dia. |
|---|---|---|---|---|---|
| 1 | 15.153 | 1.10 | 1.835 | 42.72 | 7.639 |
| 2 | 4.940 | 2.05 | | | 4.445 |
| 3* | 65.000 | 0.70 | 1.805 | 40.89 | 4.259 |
| 4* | 3.408 | 3.49 | | | 2.856 |
| 5 | −3.800 | 0.78 | 1.911 | 35.25 | 1.769 |
| 6 | −150.000 | 0.77 | | | 1.766 |
| 7* | 5.034 | 2.00 | 1.829 | 37.00 | 1.750 |
| 8* | −6.802 | 0.50 | | | 1.617 |
| STO | Infinity | 0.00 | | | 1.365 |
| 10 | Infinity | 2.20 | 2.001 | 29.13 | 1.365 |
| 11 | Infinity | 2.20 | 2.001 | 29.13 | 1.412 |
| 12 | Infinity | 1.02 | | | 1.550 |
| 13 | 4.396 | 2.60 | 1.593 | 68.62 | 2.100 |
| 15 | −3.355 | 0.40 | 1.923 | 20.88 | 2.120 |
| 16 | 10.439 | 0.47 | | | 2.330 |
| 17* | 4.079 | 3.50 | 1.589 | 60.50 | 3.084 |
| 18* | −4.568 | 1.43 | | | 3.149 |
| 19 | Infinity | 0.11 | 1.517 | 64.20 | 2.843 |
| 20 | Infinity | 0.50 | | | 2.832 |
| IMG | Infinity | | | | 2.761 |

Table 2 below enumerates aspheric coefficients of a plurality of lenses of the first lens group 111 and the second lens group 112, and the aspheric coefficients may be calculated by following Equation 10.

$$Z = \frac{CY^2}{1+\sqrt{1-(K+1)C^2Y^2}} + aY^4 + bY^6 + cY^8 + dY^{10} + eY^{12} \qquad \text{[Equation 10]}$$

wherein "Z" may refer to the distance from the apex of a lens in the optical-axis direction; "C" may refer to the basic curvature (1/R) of the lens; "Y" may refer to a distance in a direction perpendicular to the optical axis; "K" may refer to a conic constant; and "a", "b", "c", "d", and "e" may refer to aspheric coefficients, respectively.

TABLE 2

| surface | K | A | B | C | D | E | F |
|---|---|---|---|---|---|---|---|
| 3 | 0 | 7.963396E−03 | −1.168235E−03 | 1.085995E−04 | −5.621318E−06 | 1.529595E−07 | −1.709002E−09 |
| 4 | −1 | 5.317397E−03 | 6.788825E−04 | −4.540966E−04 | 8.457521E−05 | −5.702751E−06 | 1.147745E−07 |
| 7 | 0 | −3.713816E−03 | 2.643098E−04 | −2.274994E−05 | 6.084193E−07 | 0.000000E+00 | 0.000000E+00 |
| 8 | −1 | 7.845092E−04 | −4.693627E−05 | 2.942872E−05 | −3.069743E−06 | 0.000000E+00 | 0.000000E+00 |
| 17 | 0 | −3.668599E−03 | −3.763073E−04 | 1.060078E−04 | −1.594245E−05 | 1.142967E−06 | −3.067479E−08 |
| 18 | 0 | 1.387334E−02 | −1.991888E−03 | 2.061813E−04 | −1.188503E−05 | 1.605167E−07 | 1.330521E−08 |

Figure 10:
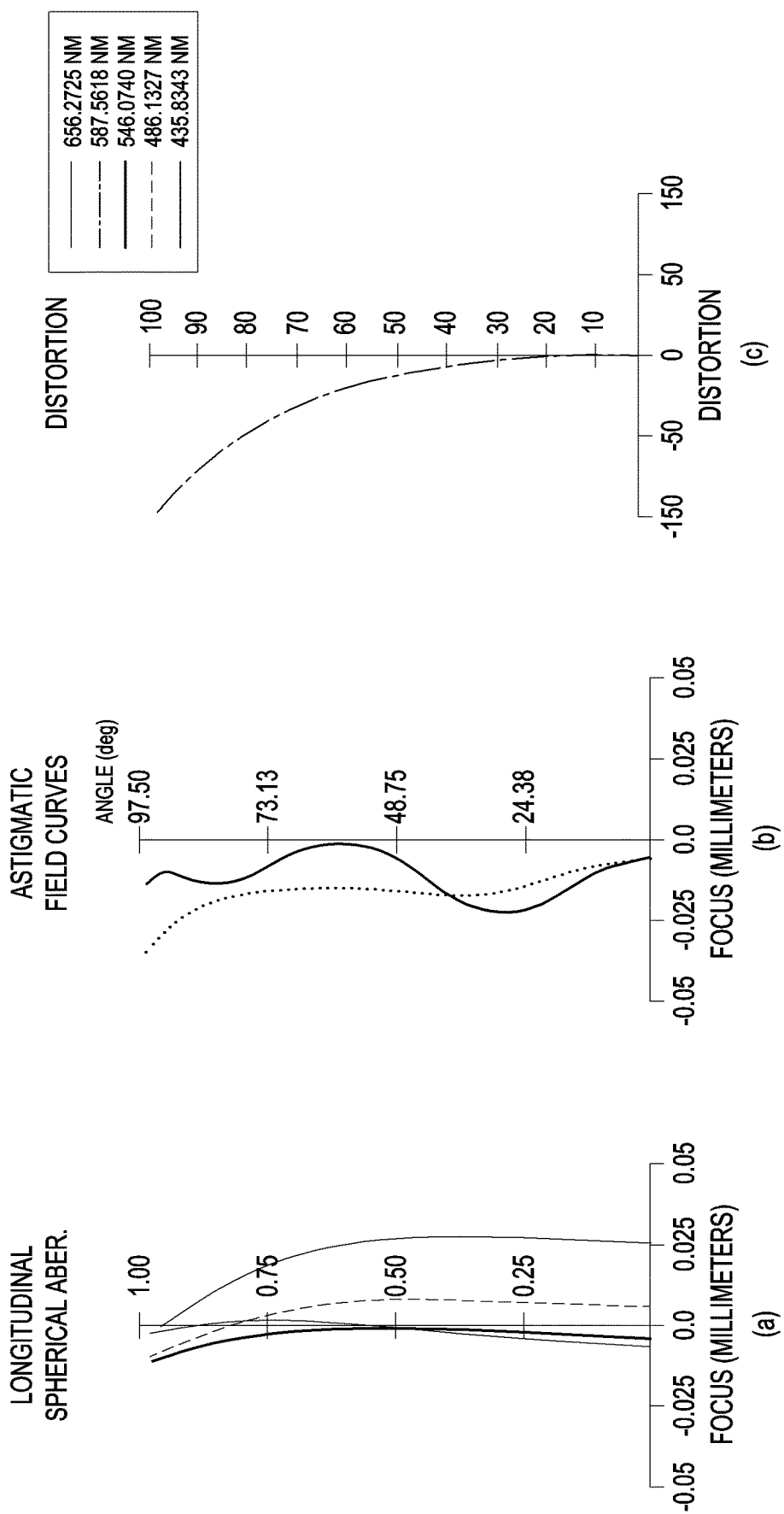
FIG. 10A is a graph illustrating the spherical aberration of a lens assembly 110 according to one of various embodiments of the disclosure.
FIG. 10B is a graph illustrating the astigmatism of a lens assembly 110 according to one of various embodiments of the disclosure.
FIG. 10C is a graph illustrating the distortion ratio of a lens assembly 110 according to one of various embodiments of the disclosure.

FIG. 10A is a graph illustrating the spherical aberration of a lens assembly 110 according to one of various embodiments of the disclosure.

In FIG. 10A, the horizontal axis corresponds to the coefficient of longitudinal spherical aberration, and the vertical axis is a normalized representation of the distance from the center of the optical axis, and illustrates a change in the longitudinal spherical aberration according to the wavelength of light.

FIG. 10B is a graph illustrating the astigmatism of a lens assembly 110 according to one of various embodiments of the disclosure.

In FIG. 10B, the astigmatism of the lens assembly 100 is a result obtained from a wavelength of 546.074 nm, the solid line indicates astigmatism in the tangential direction, and the dotted line indicates astigmatism in the sagittal direction.

FIG. 10C is a graph illustrating the distortion ratio of a lens assembly 110 according to one of various embodiments of the disclosure.

Referring to FIG. 10C, the image obtained through the lens assembly 110 exhibits slight distortion at a point that deviates from the optical axis. However, such a degree of distortion is common in the case of optical devices using lenses, and the distortion ratio is less than 1%, making it possible to provide good optical characteristics.

Figure 11:
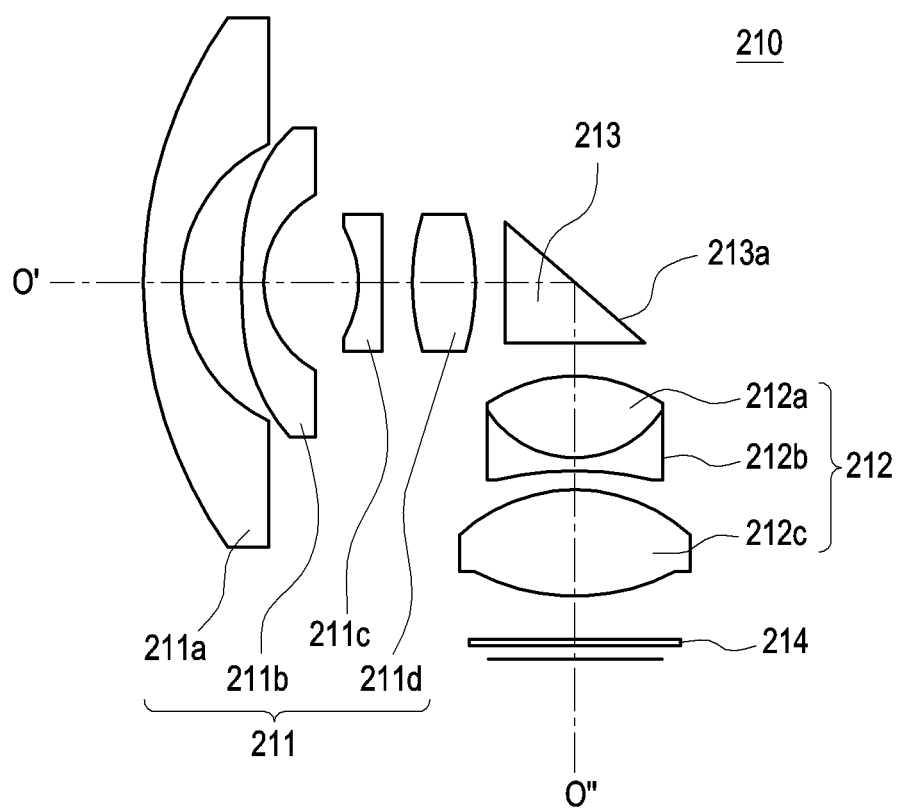
FIG. 11 is a sectional view illustrating the arrangement structure of a lens assembly 210 according to various embodiments of the disclosure.
Figure 12:
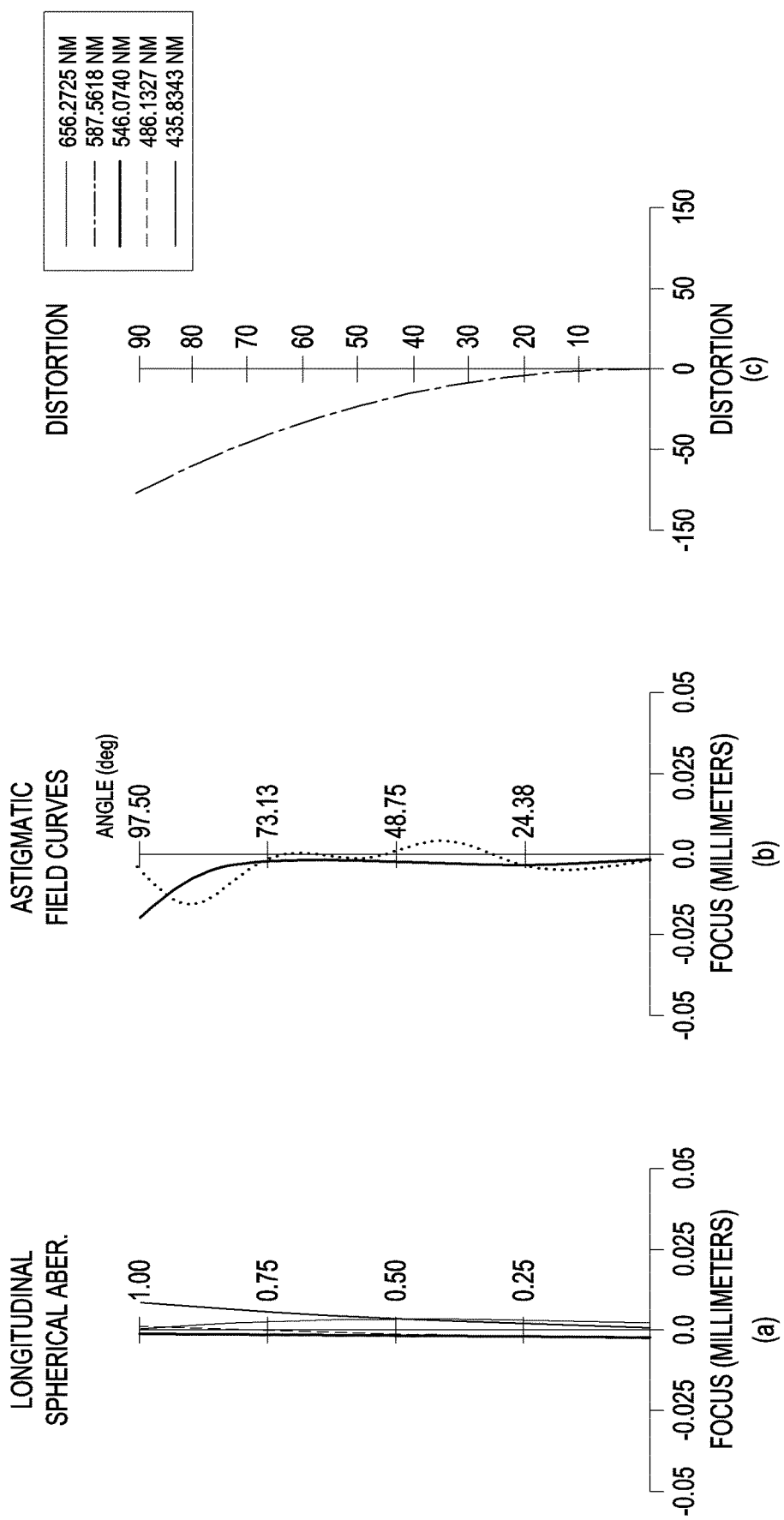
FIG. 12A, FIG. 12B, and FIG. 12C are graphs illustrating the spherical aberration, astigmatism, and distortion ratio of the lens assembly 210 structure of FIG. 11 according to various embodiments of the disclosure.

FIG. 11 is a sectional view illustrating the arrangement structure of a lens assembly 210 according to various embodiments of the disclosure. FIG. 12 is a graph illustrating the spherical aberration, astigmatism, and distortion ratio of the lens assembly 210 structure of FIG. 11 according to various embodiments of the disclosure.

The lens assembly 210 structure illustrated in FIG. 11 and FIG. 12 may be identical to part or all of the optical system structure 100 including a lens assembly 110 illustrated in FIG. 1 to FIG. 6.

Referring to FIG. 11 and FIG. 12, the optical device according to one of various embodiments of the disclosure may include a plurality of optical system structures having at least one lens assembly 210 disposed thereon.

According to various embodiments, the lens assembly 210 inside each optical system structure of the plurality of optical system structures may include a first lens group 211 including a plurality of lenses having the same optical axis, a second lens group 212 including a plurality of lenses having an optical axis identical to or different from that of the first lens group 211, and a diffraction structure 213 disposed between the first lens group 211 and the second lens group 212.

Table 3 below enumerates lens data of the lens assembly 210, and "S1-S21" may refer to the refraction surface 213a of the relevant lens (first lens group 211 and the second lens group 212 and/or the refraction structure 213). The lens assembly 210 may satisfy the above-mentioned condition (and/or at least one of the above-mentioned conditions) while having an f-number of 0.72, a half view-angle of 195°, and a focal distance of 2.06 mm.

TABLE 3

| surface | radius | Thick | Ind | Abv | Effec. Dia. |
|---|---|---|---|---|---|
| 1 | 6.770 | 0.37 | 1.835 | 42.70 | 3.521 |
| 2 | 2.148 | 1.27 | | | 2.029 |
| 3* | −14.453 | 0.24 | 1.740 | 49.10 | 1.977 |
| 4* | 1.904 | 1.25 | | | 1.379 |
| 5 | −2.613 | 0.18 | 1.593 | 68.60 | 1.370 |
| 6 | 21.686 | 0.16 | | | 1.426 |
| 7* | 3.047 | 0.84 | 1.805 | 40.90 | 1.508 |
| 8* | −3.469 | 0.42 | | | 1.488 |
| 9 | Infinity | 1.21 | 2.001 | 25.50 | 1.104 |
| 10 | Infinity | 1.21 | 2.001 | 25.50 | 0.897 |
| 11 | Infinity | 0.42 | | | 0.701 |
| STO | Infinity | 0.08 | | | 0.557 |
| 13 | 1.505 | 0.49 | 1.729 | 54.70 | 0.563 |
| 14 | −5.142 | 0.11 | 1.847 | 23.80 | 0.596 |
| 15 | 1.524 | 0.07 | | | 0.623 |
| 16* | 1.951 | 0.39 | 1.689 | 52.70 | 0.673 |
| 17* | −3.628 | 1.02 | | | 0.719 |
| 18 | Infinity | 0.16 | 1.517 | 64.20 | 1.038 |
| 19 | Infinity | 0.16 | | | 1.068 |
| 20 | Infinity | 0.26 | 1.517 | 64.20 | 1.114 |
| 21 | Infinity | 0.28 | | | 1.164 |
| IMG | Infinity | | | | 1.250 |

Table 4 below enumerates aspheric coefficients of a plurality of lenses of the first lens group 211 and the second lens group 212, and the aspheric coefficients may be calculated by Equation 10 given above.

TABLE 4

| surface | K | A | B | C | D | E |
|---|---|---|---|---|---|---|
| 3 | 0.000000 | 5.230175E−02 | −1.290260E−02 | 2.718709E−03 | −4.867408E−04 | 3.612638E−05 |
| 4 | −0.018550 | 2.876307E−02 | 5.488615E−02 | −6.310769E−02 | 4.486594E−02 | −1.120746E−02 |
| 7 | 0.000000 | −2.900078E−02 | 7.151029E−03 | −5.049141E−04 | | |
| 8 | 0.000000 | 6.977398E−04 | 1.542743E−03 | 4.644980E−04 | | |
| 16 | 0.000000 | −3.531898E−02 | 1.572334E−02 | 2.221693E−02 | | |
| 17 | 0.000000 | 3.143398E−02 | −1.590325E−03 | 6.424623E−02 | | |

FIG. 12A is a graph illustrating the spherical aberration of a lens assembly 210 according to one of various embodiments of the disclosure.

In FIG. 12A, the horizontal axis corresponds to the coefficient of longitudinal spherical aberration, and the vertical axis is a normalized representation of the distance from the center of the optical axis. A change in the longitudinal spherical aberration according to the wavelength of light is illustrated in FIG. 12A.

FIG. 12B is a graph illustrating the astigmatism of a lens assembly 210 according to one of various embodiments of the disclosure.

In FIG. 12B, the astigmatism of the lens assembly 200 is a result obtained from a wavelength of 546.074 nm, the solid line indicates astigmatism in the tangential direction, and the dotted line indicates astigmatism in the sagittal direction.

FIG. 12C is a graph illustrating the distortion ratio of a lens assembly 210 according to one of various embodiments of the disclosure.

Referring to FIG. 12C, the image obtained through the lens assembly 210 exhibits slight distortion at a point that deviates from the optical axis. However, such a degree of distortion is common in the case of optical devices using lenses, and the distortion ratio is less than 1%, making it possible to provide good optical characteristics.

Figure 13:
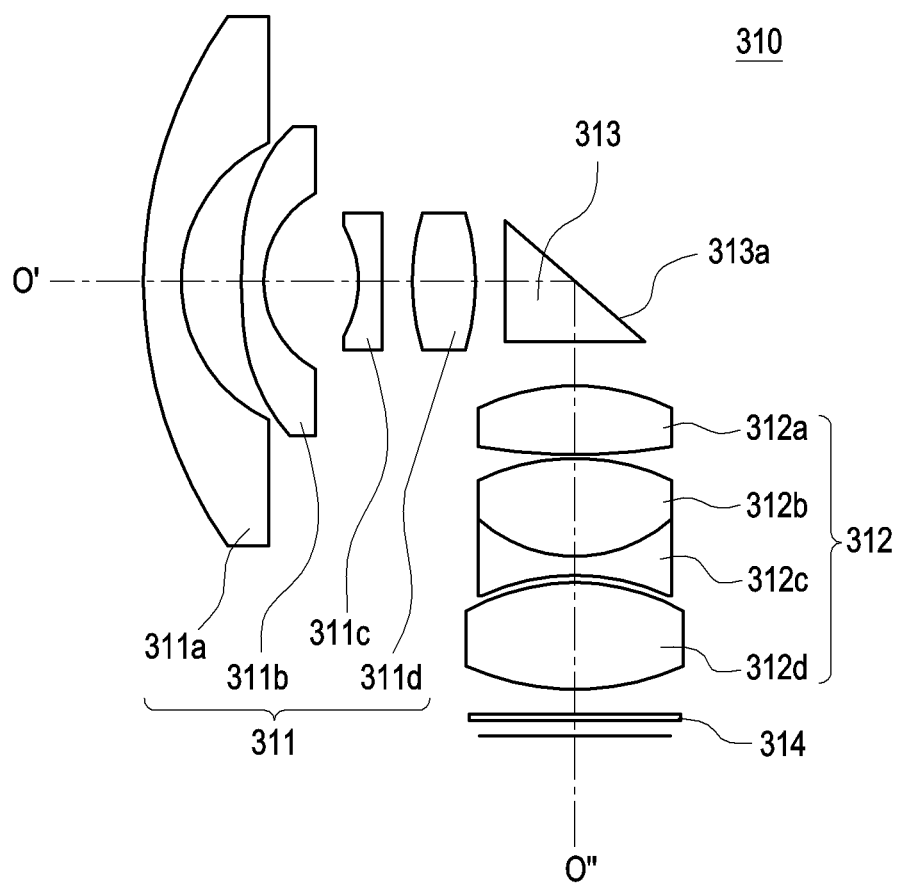
FIG. 13 is a sectional view illustrating the arrangement structure of a lens assembly 310 according to various embodiments of the disclosure.
Figure 14:
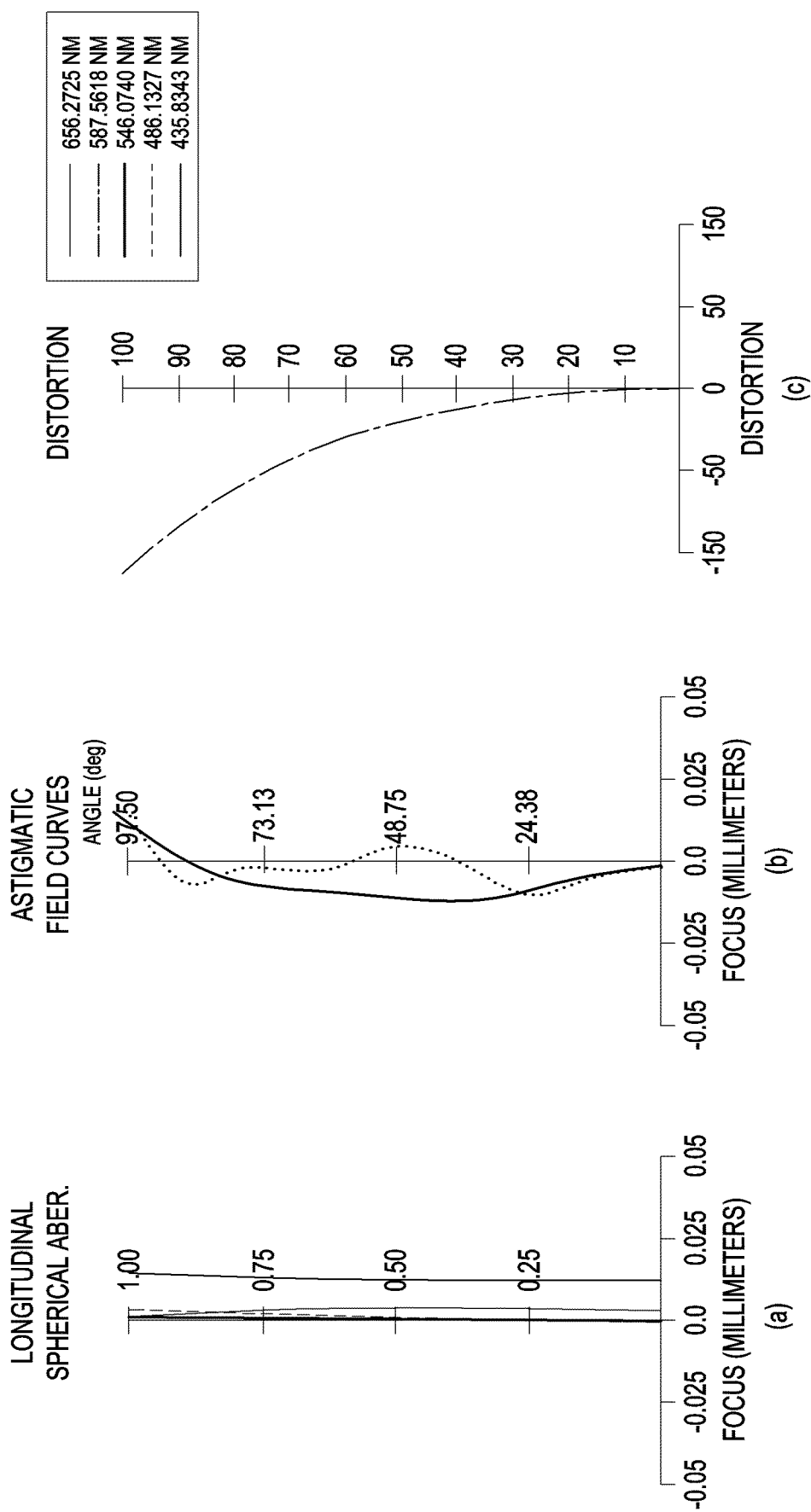
FIG. 14A, FIG. 14B, and FIG. 14C are graphs illustrating the spherical aberration, astigmatism, and distortion ratio of the lens assembly 310 structure of FIG. 13 according to various embodiments of the disclosure.

FIG. 13 is a sectional view illustrating the arrangement structure of a lens assembly 310 according to various embodiments of the disclosure. FIG. 14 is a graph illustrating the spherical aberration, astigmatism, and distortion ratio of the lens assembly 310 structure of FIG. 13 according to various embodiments of the disclosure.

TABLE 5

| surface | radius | Thick | Ind | Abv | Effec. Dia. |
| --- | --- | --- | --- | --- | --- |
| 1 | 11.500 | 1.00 | 1.835 | 42.72 | 6.220 |
| 2 | 3.991 | 1.61 | | | 3.560 |
| 3* | 26.871 | 0.55 | 1.805 | 40.90 | 3.280 |
| 4* | 2.569 | 2.30 | | | 2.090 |
| 5 | −2.800 | 0.55 | 1.911 | 35.25 | 1.310 |
| 6 | infinity | 0.49 | | | 1.280 |
| 7* | 5.571 | 1.50 | 1.816 | 39.42 | 1.240 |
| 8* | −4.179 | 0.20 | | | 1.100 |
| STO | Infinity | 0.20 | | | 0.930 |
| 10 | Infinity | 1.60 | 2.001 | 29.13 | 0.970 |
| 11 | Infinity | 1.60 | 2.001 | 29.13 | 1.110 |
| 12 | Infinity | 1.00 | | | 1.260 |
| 13 | 4.800 | 1.40 | 1.497 | 81.61 | 1.880 |
| 14 | −11.999 | 0.10 | | | 1.980 |
| 15 | 5.270 | 2.00 | 1.697 | 56.64 | 2.030 |
| 16* | −2.800 | 0.01 | 1.514 | 42.83 | 1.930 |
| 17* | −2.800 | 0.40 | 1.908 | 21.51 | 1.930 |
| 18 | 4.718 | 0.15 | | | 1.940 |
| 19 | 3.391 | 2.2 | 1.587 | 61.30 | 2.080 |
| 20 | −3.574 | 0.396 | | | 2.200 |
| 21 | Infinity | 0.11 | 1.517 | 64.20 | 2.150 |
| 22 | Infinity | | | | 2.140 |
| IMG | Infinity | | | | 2.108 |

Table 6 below enumerates aspheric coefficients of a plurality of lenses of the first lens group 311 and the second lens group 312, and the aspheric coefficients may be calculated by Equation 10 given above.

TABLE 6

| surface | K | A | B | C | D | E |
| --- | --- | --- | --- | --- | --- | --- |
| 3 | 0.000000 | 1.142927E−02 | −2.351101E−03 | 3.255237E−04 | −2.185343E−05 | 5.864670E−07 |
| 4 | −1.000000 | 9.164343E−03 | 4.565874E−03 | −3.133200E−03 | 8.462104E−04 | −6.586592E−05 |
| 7 | 0.000000 | −7.971247E−03 | 9.718798E−04 | −1.340611E−04 | 0.000000E+00 | |
| 8 | −1.000000 | −5.965819E−05 | 5.895404E−05 | 0.000000E+00 | 0.000000E+00 | |
| 19 | 0.000000 | −1.015751E−02 | 6.893529E−04 | −3.631576E−04 | 5.134137E−05 | |
| 20 | 0.000000 | 3.394659E−02 | −6.665382E−03 | 4.705983E−04 | 6.087475E−06 | |

The lens assembly 310 structure illustrated in FIG. 13 and FIG. 14 may be identical to part or all of the optical system structure 100 including a lens assembly 110 illustrated in FIG. 1 to FIG. 6.

Referring to FIG. 13 and FIG. 14, the optical device according to one of various embodiments of the disclosure may include a plurality of optical system structures having at least one lens assembly 310 disposed thereon.

According to various embodiments, the lens assembly 310 inside each optical system structure of the plurality of optical system structures may include a first lens group 311 including a plurality of lenses having the same optical axis, a second lens group 312 including a plurality of lenses having an optical axis identical to or different from that of the first lens group 311, and a diffraction structure 313 disposed between the first lens group 311 and the second lens group 312.

Table 5 below enumerates lens data of the lens assembly 310, and "S1-S22" may refer to the refraction surface 313a of the relevant lens (first lens group 311 and the second lens group 312 and/or the refraction structure 313). The lens assembly 310 may satisfy the above-mentioned condition (and/or at least one of the above-mentioned conditions) while having an f-number of 1.09, a half view-angle of 200°, and a focal distance of 2.27 mm.

FIG. 14A is a graph illustrating the spherical aberration of a lens assembly 310 according to one of various embodiments of the disclosure.

In FIG. 14A, the horizontal axis corresponds to the coefficient of longitudinal spherical aberration, and the vertical axis is a normalized representation of the distance from the center of the optical axis. A change in the longitudinal spherical aberration according to the wavelength of light is illustrated in FIG. 14A.

FIG. 14B is a graph illustrating the astigmatism of a lens assembly 310 according to one of various embodiments of the disclosure.

In FIG. 14B, the astigmatism of the lens assembly 300 is a result obtained from a wavelength of 546.074 nm, the solid line indicates astigmatism in the tangential direction, and the dotted line indicates astigmatism in the sagittal direction.

FIG. 14C is a graph illustrating the distortion ratio of a lens assembly 310 according to one of various embodiments of the disclosure.

Referring to FIG. 14C, the image obtained through the lens assembly 310 exhibits slight distortion at a point that deviates from the optical axis. However, such a degree of distortion is common in the case of optical devices using lenses, and the distortion ratio is less than 1%, making it possible to provide good optical characteristics.

Figure 15:
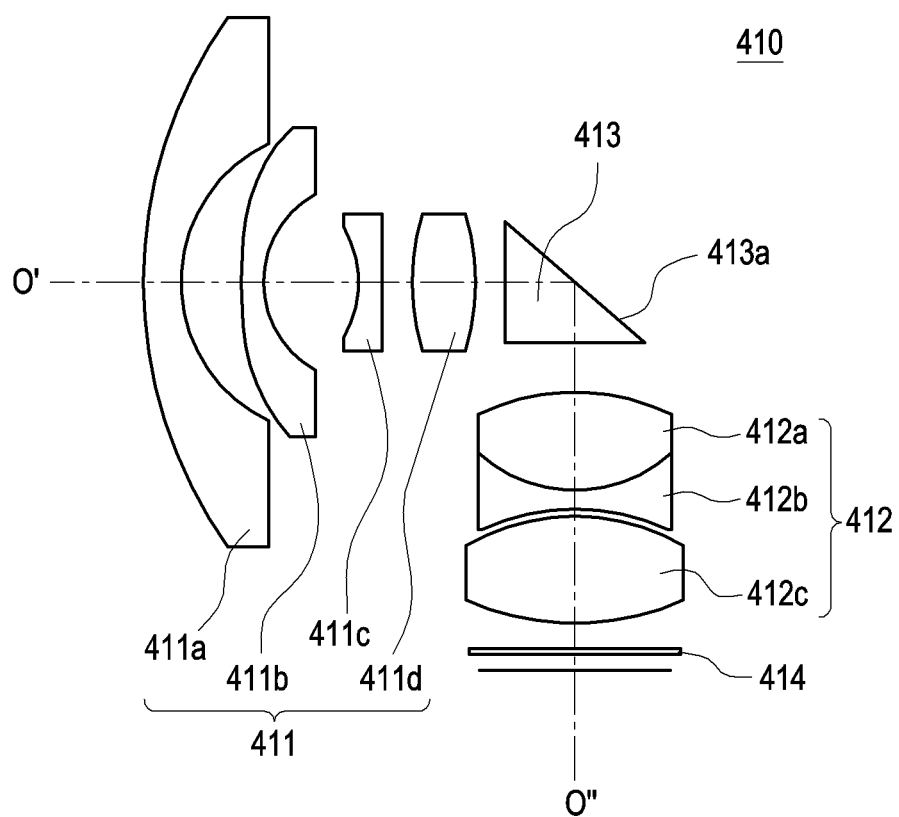
FIG. 15 is a sectional view illustrating the arrangement structure of a lens assembly 410 according to various embodiments of the disclosure.
Figure 16:
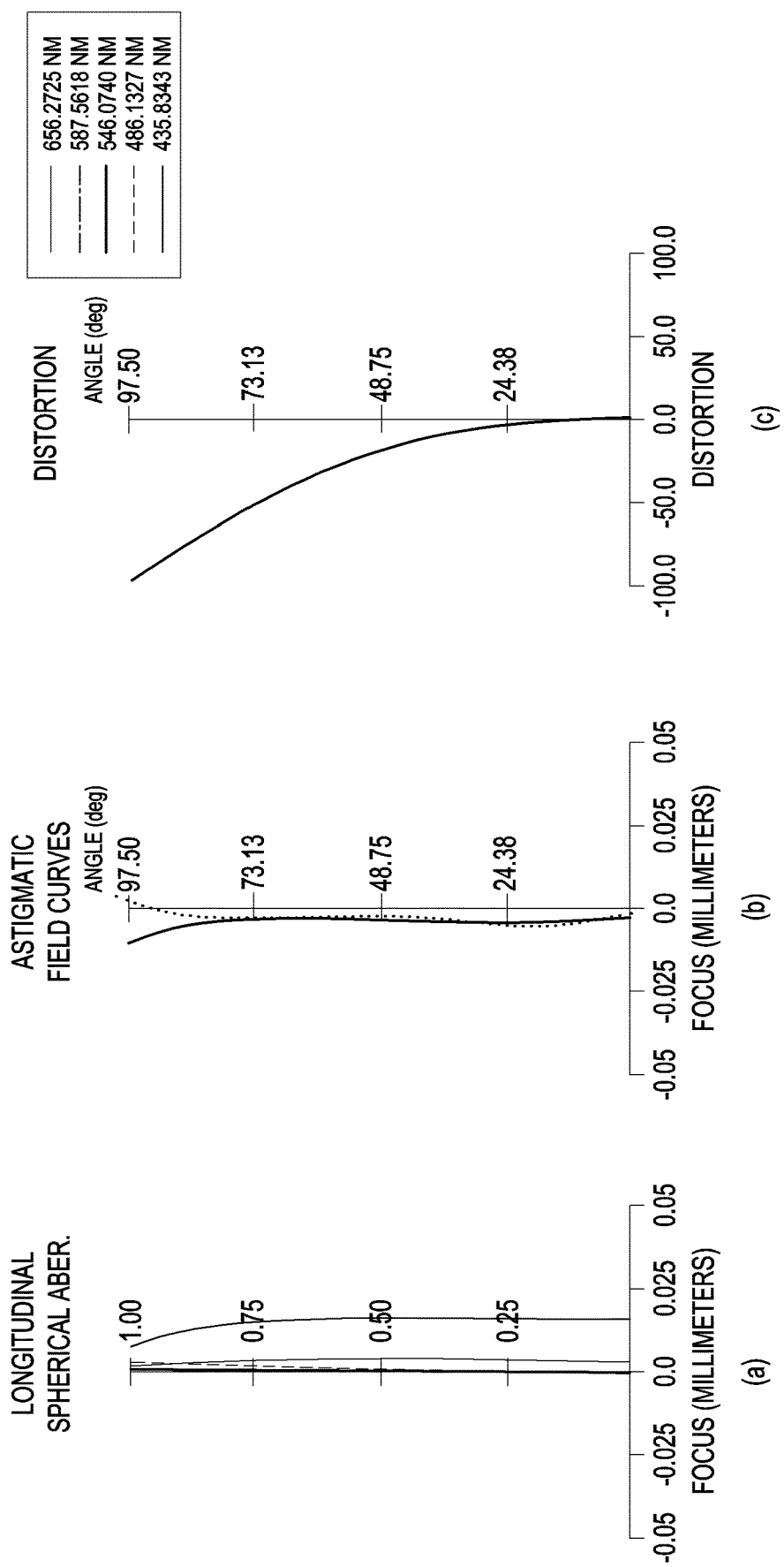
FIG. 16A, FIG. 16B, and FIG. 16C are graphs illustrating the spherical aberration, astigmatism, and distortion ratio of the lens assembly 410 structure of FIG. 15 according to various embodiments of the disclosure.

FIG. 15 is a sectional view illustrating the arrangement structure of a lens assembly 410 according to various embodiments of the disclosure. FIG. 16 is a graph illustrating the spherical aberration, astigmatism, and distortion ratio of the lens assembly 410 structure of FIG. 15 according to various embodiments of the disclosure.

The lens assembly 410 structure illustrated in FIG. 15 and FIG. 16 may be identical to part or all of the optical system structure 100 including a lens assembly 110 illustrated in FIG. 1 to FIG. 6.

Referring to FIG. 15 and FIG. 16, the optical device according to one of various embodiments of the disclosure may include a plurality of optical system structures having at least one lens assembly 410 disposed thereon.

According to various embodiments, the lens assembly 410 inside each optical system structure of the plurality of optical system structures may include a first lens group 411 including a plurality of lenses having the same optical axis, a second lens group 412 including a plurality of lenses having an optical axis identical to or different from that of the first lens group 411, and a diffraction structure 413 disposed between the first lens group 411 and the second lens group 412.

Table 7 below enumerates lens data of the lens assembly 410, and "S1-S20" may refer to the refraction surface 413a of the relevant lens (first lens group 411 and the second lens group 412 and/or the refraction structure 413). The lens assembly 410 may satisfy the above-mentioned condition (and/or at least one of the above-mentioned conditions) while having an f-number of 0.85, a half view-angle of 180°, and a focal distance of 1.95 mm.

TABLE 7

| surface | radius | Thick | Ind | Abv | Effec. Dia. |
|---|---|---|---|---|---|
| 1 | 11.685 | 1.00 | 1.804 | 46.50 | 4.482 |
| 2 | 3.000 | 1.19 | | | 2.514 |
| 3* | 30.000 | 0.55 | 1.740 | 49.10 | 2.415 |
| 4* | 2.500 | 2.33 | | | 1.800 |
| 5 | −2.800 | 0.65 | 1.881 | 37.74 | 1.185 |
| 6 | −93.579 | 0.81 | | | 1.219 |
| 7* | 4.964 | 1.84 | 1.805 | 40.90 | 1.276 |
| 8* | −4.815 | 0.34 | | | 1.188 |
| STO | Infinity | 0.20 | | | 1.020 |
| 10 | Infinity | 1.60 | 2.001 | 29.13 | 1.037 |
| 11 | Infinity | 1.60 | 2.001 | 29.13 | 1.129 |
| 12 | Infinity | 0.80 | | | 1.240 |
| 13 | 3.354 | 2.10 | 1.657 | 59.01 | 1.570 |
| 14 | −2.736 | 0.03 | | | 1.493 |
| 15 | −2.628 | 0.40 | 1.915 | 21.12 | 1.477 |
| 16 | 5.419 | 0.16 | | | 1.539 |
| 17* | 2.623 | 2.30 | 1.687 | 52.80 | 1.763 |
| 18* | −3.947 | 0.76 | | | 1.683 |
| 19 | Infinity | 0.11 | 1.517 | 64.20 | 1.365 |
| 20 | Infinity | 0.50 | | | 1.343 |
| IMG | Infinity | | | | 1.200 |

Table 8 below enumerates aspheric coefficients of a plurality of lenses of the first lens group 411 and the second lens group 412, and the aspheric coefficients may be calculated by Equation 10 given above.

TABLE 8

| surface | K | A | B | C | D | E |
|---|---|---|---|---|---|---|
| 3 | 0.000000 | 1.693505E−02 | −5.618770E−03 | 1.102048E−03 | −1.097124E−04 | 4.200695E−06 |
| 4 | −1.000000 | 1.883581E−02 | 1.241509E−03 | −3.958115E−03 | 1.820494E−03 | −2.225921E−04 |
| 7 | 0.000000 | −7.627915E−03 | 5.479538E−04 | −2.609108E−04 | 0.000000E+00 | |
| 8 | −1.000000 | −1.037569E−03 | −3.243341E−04 | 0.000000E+00 | 0.000000E+00 | |
| 17 | 0.000000 | −1.164093E−02 | 1.534594E−04 | −6.081609E−05 | 2.241342E−06 | |
| 18 | 0.000000 | 2.066767E−02 | −5.400408E−03 | 1.003558E−03 | −6.124753E−05 | |

FIG. 16A is a graph illustrating the spherical aberration of a lens assembly 410 according to one of various embodiments of the disclosure.

In FIG. 16A, the horizontal axis corresponds to the coefficient of longitudinal spherical aberration, and the vertical axis is a normalized representation of the distance from the center of the optical axis, and illustrates a change in the longitudinal spherical aberration according to the wavelength of light.

FIG. 16B is a graph illustrating the astigmatism of a lens assembly 410 according to one of various embodiments of the disclosure.

In FIG. 16B, the astigmatism of the lens assembly 400 is a result obtained from a wavelength of 546.074 nm, the solid line indicates astigmatism in the tangential direction, and the dotted line indicates astigmatism in the sagittal direction.

FIG. 16C is a graph illustrating the distortion ratio of a lens assembly 410 according to one of various embodiments of the disclosure.

Referring to FIG. 16C, the image obtained through the lens assembly 410 exhibits slight distortion at a point that deviates from the optical axis. However, such a degree of distortion is common in the case of optical devices using lenses, and the distortion ratio is less than 1%, making it possible to provide good optical characteristics.

Table 9 below enumerates values related to conditional formulas applied to Equations 1-9 with regard to the lens assemblies of the above embodiments (FIG. 7 (EX1), FIG. 11 (EX2), FIG. 13(EX3), and FIG. 14(EX4)).

TABLE 9

| | | Embodiments | | | |
|---|---|---|---|---|---|
| | Conditional formulas | EX1 | EX2 | EX3 | EX4 |
| (1) | Drear/F | 8.225 | 6.421 | 9.062 | 10.253 |
| (2) | Dfront/Drear | 1.075 | 1.281 | 1.015 | 1.200 |
| (3) | sqrt[{(CA1st/2)^2 + D1^2}/ { Drear^2 + Y^2}] | 0.950 | 1.105 | 0.911 | 1.011 |
| (4) | (EffD_ReflctS^2)/(F*2Y) | 1.050 | 1.786 | 1.087 | 2.490 |
| (5) | D1/Drear | 0.785 | 0.856 | 0.685 | 0.882 |
| (6) | D1/F | 6.239 | 5.496 | 6.205 | 9.046 |

Figure 17:
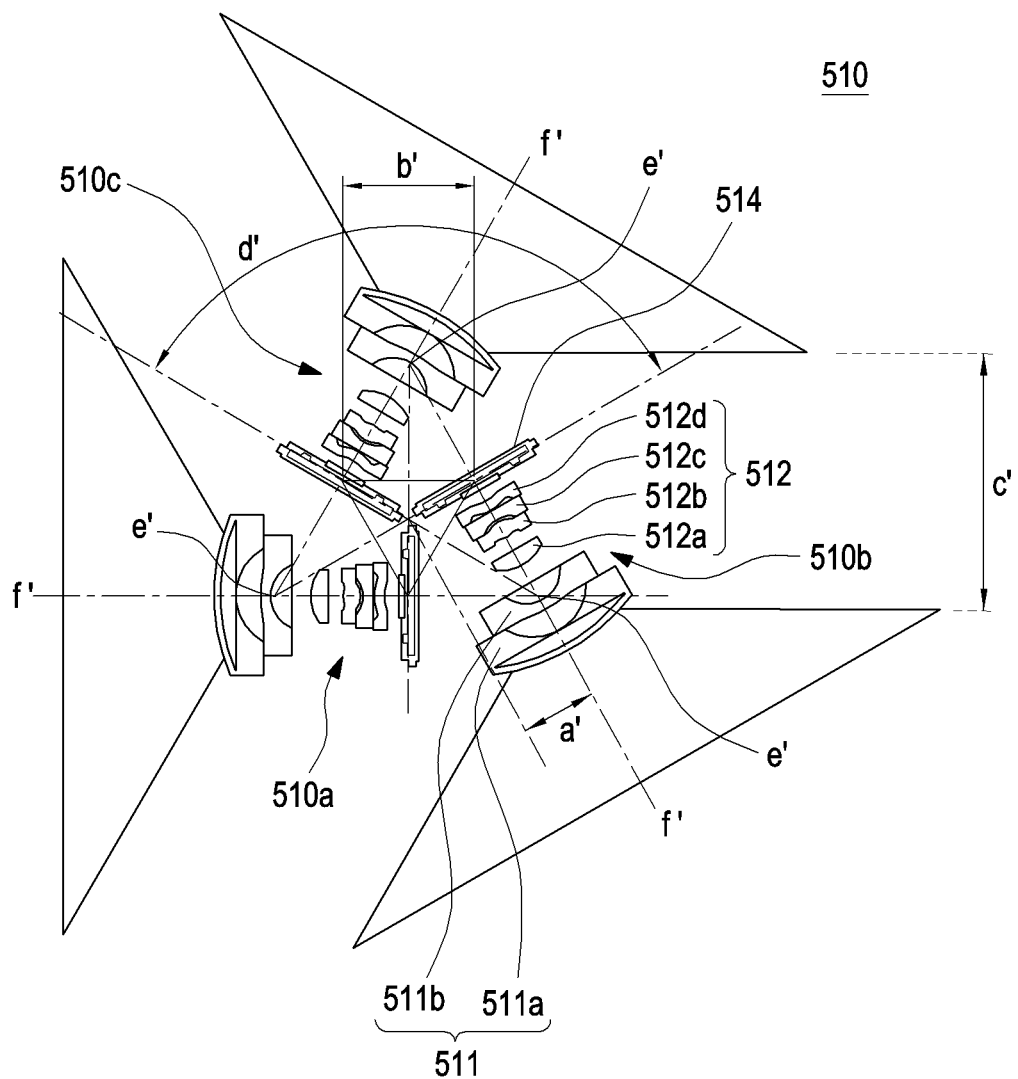
FIG. 17 is a top view illustrating an optical device 510 including a plurality of lens assemblies according to various embodiments of the disclosure.

FIG. 17 is a top view illustrating an optical device 510 including a plurality of lens assemblies according to various embodiments of the disclosure.

Referring to FIG. 17, the optical device 510 according to one of various embodiments of the disclosure may include a plurality of optical system structures having at least one lens assembly disposed thereon.

According to various embodiments, respective lens assemblies 510a, 510b, and 510c of the optical device 510 may include a first lens group 511 including a plurality of lenses having the same optical axis F, a second lens group 512 including a plurality of lenses having the same optical axis F as that of the first lens group 511, and an image sensor 514.

According to various embodiments, the first lens group 511 may include a plurality of lenses 511a and 511b having the same optical axis F'. For example, the plurality of lenses 511a and 511b may include a first lens 511a and a second lens 511b arranged successively from near the subject so as to face the image sensor 514. The first to second lenses 511a and 511b may include plastic lenses, respectively, and may be disposed to be optical-axis-aligned with one surface of the image sensor 514 so as to form a single optical axis F' of the lens assembly.

According to various embodiments, the second lens group 512 may include a plurality of lenses 512a, 512b, 512c, and 512d having the same optical axis F' as that of the first lens group 511. The second lens group 512 may be configured to have a size smaller than that of the first lens group 511, and may be arranged between the first lens group 511 and the image sensor 514. For example, the plurality of lenses 512a, 512b, 512c, and 512d may include a third lens 512a, a fourth lens 512b, a fifth lens 512c, and a sixth lens 512d successively disposed from near the subject so as to face the image sensor 514. The third to sixth lenses 512a, 512b, 512c, and 512d may include plastic lenses, respectively, and may be disposed to be optical-axis-aligned with one surface of the image sensor 514 so as to form a single optical axis F' of the lens assemblies.

The smaller the interval (for example, air interval) between each of the plurality of lenses of the first to second lens groups 511 and 512 and another lens adjacent thereto, the smaller the total length of the lens assembly may be. According to various embodiments, the interval between lenses may be variously designed according to optical characteristics (for example, aberration characteristics, wide-angle characteristics, and/or brightness characteristics) required for the lens assembly. According to various embodiments, the lens assembly may include an image sensor 514 disposed to face the second lens group 512.

According to various embodiments, the lens assembly may include a diaphragm (not illustrated) disposed on a surface of the first lens 511a facing the subject. By adjusting the size of the diaphragm, the amount of light reaching the image-forming surface 514a of the image sensor 514 may be adjusted.

According to various embodiments, the optical device 510 may further include an infrared blocking filter (not illustrated) disposed between the sixth lens 512d and the image sensor 514. The infrared blocking filter may block light (for example, infrared rays) which is invisible to human eyes, but which is detected by the film of the optical device or the image sensor. For example, the infrared blocking filter may be mounted such that the color impression of images detected/obtained through the image sensor 514 approaches the color impression that people have when seeing actual objects.

According to various embodiments, the lens assemblies constituting the optical device 510 may include a first lens assembly 510a, a second lens assembly 520b disposed adjacent to the first lens assembly 510a, and a third lens assembly 510c disposed adjacent to the second lens assembly 510b. Respective lens assemblies constituting the optical device may be identical to each other.

According to various embodiments, the lens assemblies constituting the optical device 510 may include at least n identical lens assembly structures, and the optical axes f' of respective lens groups of the lens assemblies may be disposed on the same plane. As another example, line segments connecting points e' of intersection between extension lines of respective optical axes f' may form a regular polygon of n sides. For example, respective optical axes f' of the three identical lens assemblies constituting the optical device 510 (the first lens assembly 510a, the second lens assembly 510b, and the third lens assembly 510c) may be disposed on the same plane, and line segments connecting points e' of intersection between extension lines of respective optical axes f' may form a regular triangle.

According to various embodiments, the upper surfaces of respective image sensors 514 of the structures of respective lens assemblies 510a, 510b, and 510c constituting the optical device may formed at an angle (d') of 360°/n. For example, a separate image sensor 514 may be disposed on one side of each of the three identical lens assemblies constituting the optical device 510 (the first lens assembly 510a, the second lens assembly 510b, and the third lens assembly 510c). The upper surfaces of the three image sensors 514 may be disposed at 120°. The angle between the upper surface of the first image sensor 514 of the first lens assembly 510a and the upper surface of the second image sensor 514 of the second assembly 510b, which is disposed adjacent thereto, may be 120°.

According to various embodiments, the optical axis f' of each of the lens assemblies 510a, 510b, and 510c and the optical axis of an adjacent lens assembly may intersect at an intersection point e', and the number of intersection points e' of the optical axes may be identical to the number of optical system structures including the lens assemblies. The optical axes may be disposed at angle of 180(n−2)/n. For example, the optical axis f' of the first lens assembly 510a may intersect with the optical axis f' of the second lens assembly 510b or the third lens assembly 510c at three intersection points. As another example, each optical axis may be disposed at an angle of 180(3−2)/3=60° with an adjacent optical axis.

According to various embodiments, the arrangement structure of the plurality of lens assemblies may reduce the difference in resolution between the center and periphery of the image sensor 514, and a minimum parallax distance may be implemented regardless of the size of each lens assembly and/or the size of entire optical device. The arrangement structure of the plurality of lens assemblies may solve the stitching problem of obtained images resulting from the parallax distance (problems such as image cropping at a view angle at which two camera modules overlap), and the sensitivity of the optical device may be designed to be low.

Figure 18:
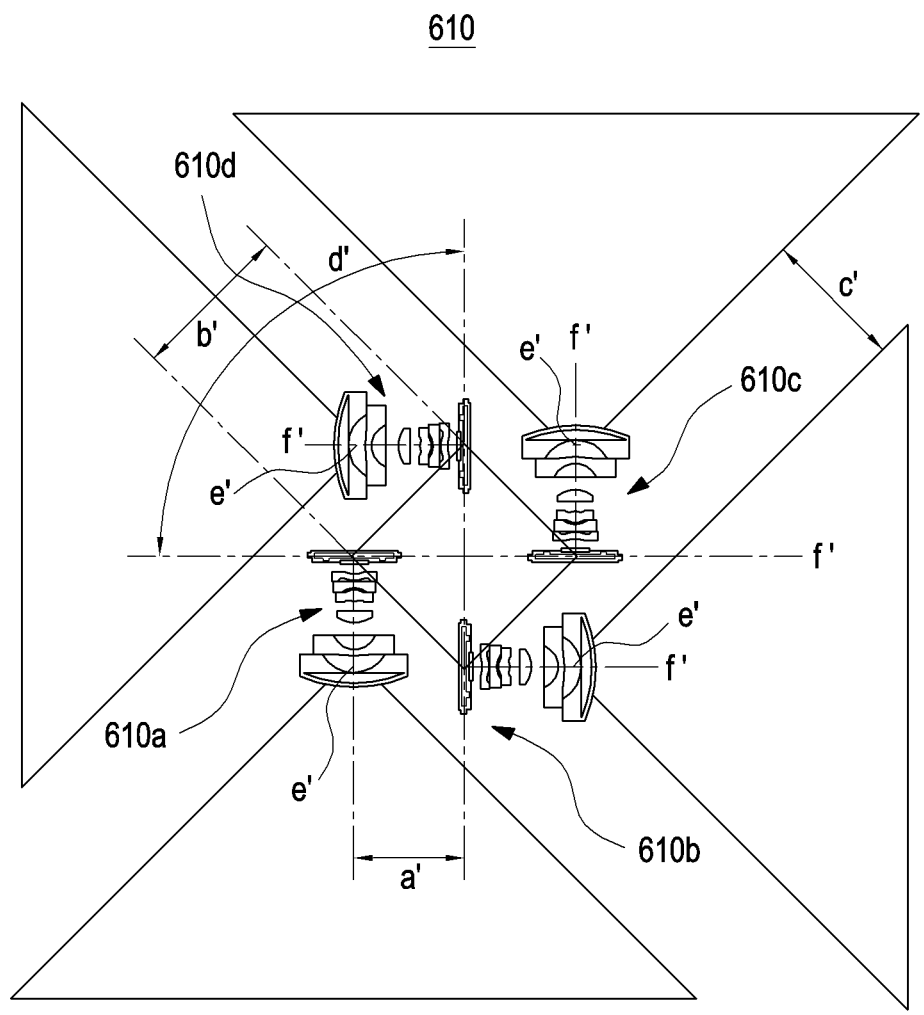
FIG. 18 is a top view illustrating an optical device 610 including a plurality of lens assemblies according to various embodiments of the disclosure.

FIG. 18 is a top view illustrating an optical device 610 including a plurality of lens assemblies according to various embodiments of the disclosure. The lens assembly structure illustrated in FIG. 18 may be identical to part or all of the lens assembly structure illustrated in FIG. 17.

Referring to FIG. 18, the optical device 610 according to one of various embodiments of the disclosure may include a plurality of optical system structures having at least one lens assembly disposed thereon.

According to various embodiments, respective lens assemblies 610a, 610b, and 610c of the optical device 610 may include a first lens group 611 including a plurality of lenses having the same optical axis F', a second lens group 612 including a plurality of lenses having the same optical axis f' as that of the first lens group 611, and an image sensor 614.

According to various embodiments, the lens assembly structures constituting the optical device 610 may include a first lens assembly 610a, a second lens assembly 620b disposed adjacent to the first lens assembly 610a, a third lens assembly 610c disposed adjacent to the second lens assembly 610b, and a fourth lens assembly 610d disposed adjacent to the third lens assembly 610c. Respective lens assemblies constituting the optical device may be identical to each other.

According to various embodiments, four lens assemblies may constitute the optical device 610. Respective optical axes f' of the four identical lens assemblies constituting the optical device (the first lens assembly 610a, the second lens assembly 610b, the third lens assembly 610c, and the fourth lens assembly) may be disposed on the same plane. Line segments connecting points e' of intersection between extension lines of respective optical axes f' may form a square.

According to various embodiments, a separate image sensor 614 may be disposed on one side of each of the four identical lens assemblies constituting the optical device 610 (the first lens assembly 610a, the second lens assembly 610b, the third lens assembly 610c, and the fourth lens assembly 610d). The upper surfaces of the four image sensors 614 may be disposed at 90°. For example, the angle between the upper surface of the first image sensor 614 of the first lens assembly 610a and the upper surface of the second image sensor 614 of the second assembly 610b, which is disposed adjacent thereto, may be 90°.

According to various embodiments, the optical axis f' of each of the lens assemblies and the optical axis f' of an adjacent lens assembly may intersect at an intersection point e', and the number of intersection points e' of the optical axes f' may be identical to the number of optical system structures including the lens assemblies. The optical axes may be disposed at angle of 180(n−2)/n. For example, the optical axis f of the first lens assembly 610a may intersect with the optical axis f' of the second lens assembly 610b or the third lens assembly 610c at three intersection points. As another example, each optical axis f' may be disposed at an angle of 180(3−2)/3=60° with an adjacent optical axis f'.

According to various embodiments, the arrangement structure of the plurality of lens assemblies may reduce the difference in resolution between the center and periphery of the image sensor, and a minimum parallax distance may be implemented regardless of the size of each lens assembly and/or the size of entire optical device.

Figure 19:
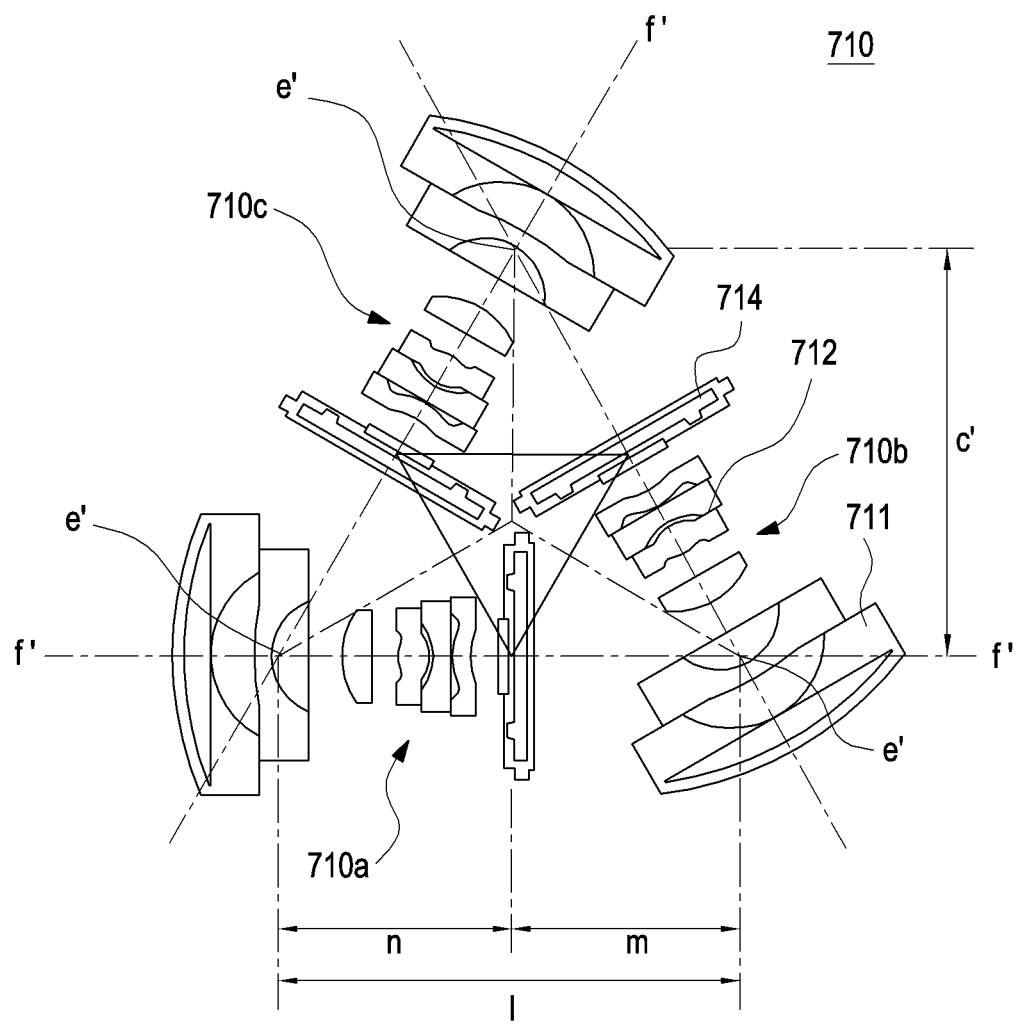
FIG. 19 is a sectional view illustrating an optical device 710 including a plurality of lens assemblies according to various embodiments of the disclosure.

FIG. 19 is a sectional view illustrating an optical device 710 including a plurality of lens assemblies according to various embodiments of the disclosure. The lens assembly structure illustrated in FIG. 19 may be identical to part or all of the lens assembly structure illustrated in FIG. 17.

Referring to FIG. 19, the optical device 710 according to one of various embodiments of the disclosure may include a plurality of optical system structures having at least one lens assembly 710a, 710b, and 710c disposed thereon.

According to various embodiments, respective lens assemblies 710a, 710b, and 710c of the optical device 710 may include a first lens group 711 including a plurality of lenses having the same optical axis f', a second lens group 712 including a plurality of lenses having the same optical axis f' as that of the first lens group 711, and an image sensor 714.

According to various embodiments, respective lens assemblies of the plurality of lens assembly structures may include a first lens assembly 710a, a second lens assembly 720b disposed adjacent to the first lens assembly 710a, and a third lens assembly 710c disposed adjacent to the second lens assembly 710b. Respective lens assemblies constituting the optical device may be identical to each other.

According to various embodiments, assuming that intersection points of optical axes f' of respective lens assemblies constitute a regular polygon, n may refer to a distance from the image upper surface of the image sensor 714 on an oblique side defined by an optical axis f' to the apex of the front surface of the image upper surface, and m may refer to a distance from the image upper surface of the image sensor 714 on an oblique side defined by an optical axis to the apex of the rear surface of the image upper surface.

On the basis of the above definition, if m=n in connection with a line segment l connecting the intersection points e', respective lens assemblies may be fabricated such that the parallax distance c' thereof does not vary even if the distance b' between the upper-surface centers of the image sensors 714 of the lens assembly structure changes, or even if the distance a' from one point o' of intersection of extension lines of image upper surfaces to the image upper surfaces.

As another example, if m<n in connection with a line segment l connecting the intersection points e', the parallax distance c' may decrease depending on the ratio of m and n and, if m>n in connection with a line segment l connecting the intersection points e', the parallax distance c' may increase depending on the ratio of m and n.

The arrangement structure of the plurality of lens assemblies may solve the stitching problem of obtained images resulting from the parallax distance (problems such as image cropping at a view angle at which two camera modules overlap), and the sensitivity of the optical device may be designed to be low.

Figure 20:
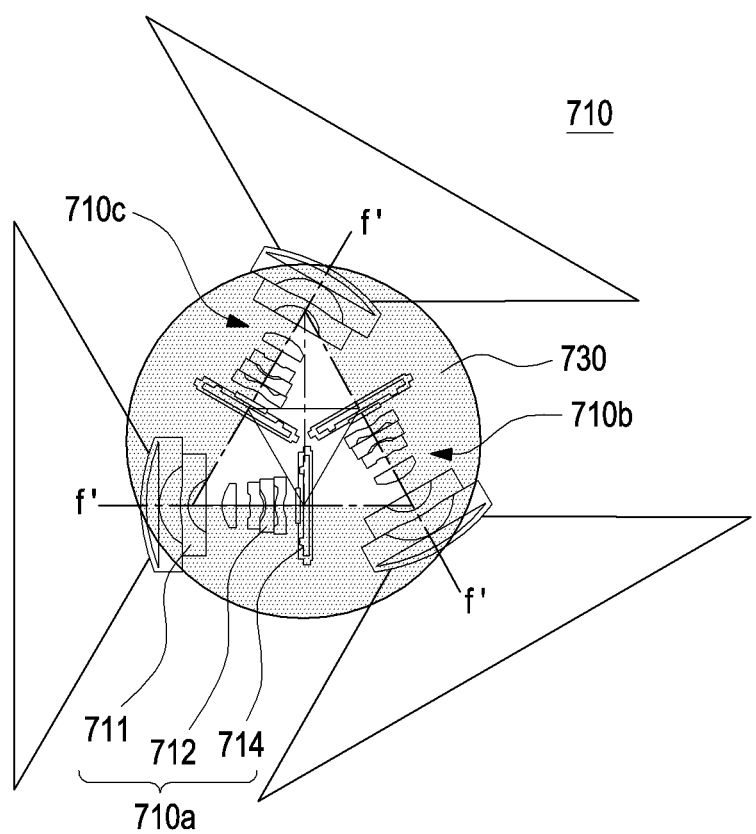
FIG. 20 is a top view illustrating an optical device 710 including a plurality of lens assemblies, including a heat-radiating structure 730, according to various embodiments of the disclosure.

FIG. 20 is a top view illustrating an optical device 710 including a plurality of lens assemblies including a heat-radiating structure 730 according to various embodiments of the disclosure. The lens assembly structure illustrated in FIG. 20 may be identical to part or all of the optical system structure including a lens assembly illustrated in FIG. 19.

Referring to FIG. 20, the optical device 710 according to one of various embodiments of the disclosure may include a plurality of optical system structures having at least one lens assembly disposed thereon.

According to various embodiments, respective lens assemblies 710a, 710b, and 710c of the optical device 710 may include a first lens group 711 including a plurality of lenses having the same optical axis f', a second lens group 712 including a plurality of lenses having the same optical axis f' as that of the first lens group 711, and an image sensor 714.

According to various embodiments, the optical device 710 may include a heat-radiating structure 730 disposed in the upper or lower area of the lens assemblies. The heat-radiating structure 730 may be disposed between a circle h' connecting the apexes of outermost lenses of respective lens assemblies 710a, 710b, and 710c and a regular polygon g' made of optical axes of respective lens assemblies 710a, 710b, and 710c, and may radiate heat generated by the image sensors 714.

According to various embodiments, the heat radiating structure 730 may include, for example, a heat pipe, a solid-state heat-radiating sheet, or liquid-state heat-radiating paint. The heat pipe, the solid-state heat-radiating sheet, or the liquid-state heat-radiating paint may be made of a material having high thermal conductivity, such as graphite, carbon nanotubes, a natural regenerated material, silicone, and silicon. As another example, the heat-radiating structure 730 may include a metal material, such as Al or Mg. The metal material has a heat-diffusing performance and thus enables additional heat distribution.

According to various embodiments, the heat-radiating structure 730 may be formed to have a size large enough to encompass the plurality of image sensors 714, and may be disposed to contact the plurality of image sensors 714 or to face the same with a predetermined gap therebetween. Heat generated by the image sensors 714 may be diffused and evenly distributed over the entire surface of the heat-radiating structure 730 and then discharged to the outside.

According to an embodiment of the disclosure, the optical device including the heat-radiating structure 730 may suppress image degradation due to heat from the image sensors 714 when moving images are taken for a long time. Unlike the configuration of some optical devices (sensors are disposed inside), the image sensors 714 are at least partially disposed outside, thereby ensuring efficient heat radiation.

According to various embodiments of the disclosure, there may be provided a lens assembly structure including a plurality of lens assemblies, at least some lens assemblies of the plurality of lens assemblies including: a first lens group having positive refractive power or negative refractive power; a second lens group having positive refractive power; and a bending structure configured to bend a path of light of the first lens group so as to correspond to an optical-axis direction of the second lens group, wherein the bending structure is disposed on the path of light of the first lens group and on a path of light of the second lens group, optical axes of the first lens groups disposed on the at least some lens assemblies, respectively, meet at a point, and optical axes of the second lens groups disposed on the at least some lens assemblies, respectively, are configured to constitute a triangle.

According to various embodiments, each lens assembly may include the first lens group, the bending structure, and the second lens group disposed from near a subject, and may be configured to satisfy following [Conditional formula 1], [Conditional formula 2], and [Conditional formula 3], respectively:

$(EffD\_ReflctS^2)/(F^*2Y)<3.0$      [Conditional formula 1]

$D1/Drear<1.0$      [Conditional formula 2]

$5<D1/F<10$      [Conditional formula 3]

wherein EffD_ReflctS refers to an effective diameter of a bending surface of the bending structure; F refers to a focal distance of the entire lens assembly structure; Y refers to an image upper-height at a maximum view angle; D1 refers to a distance from an entrance pupil of the lens assembly to a bending surface of an optical path bending structure; and Drear refers to a distance from the bending surface of the optical path bending structure to an upper surface.

According to various embodiments the angle between optical axes of the first lens groups disposed on the lens assemblies, respectively, may be 120°, the angle between optical axes of the second lens groups disposed on the lens assemblies, respectively, may be 60°, and the optical axes of the second lens groups disposed on the lens assemblies, respectively, may constitute a regular triangle.

According to various embodiments each lens assembly may include the first lens group, the bending structure, and the second lens group disposed from near a subject, and is configured to satisfy following [Conditional formula 4], [Conditional formula 5], and [Conditional formula 6], respectively:

$6<Drear/F<11$      [Conditional formula 4]

$0.9<Dfront/Drear<1.4$      [Conditional formula 5]

$0.8<sqrt[\{(CA1st/2)^2+D1^2\}/\{(Drear^2+Y^2)\}]<1.2$      [Conditional formula 6]

wherein F refers to a focal distance of the entire lens assembly structure; Dfront refers to a distance from a subject-side apex of the first lens group to a bending surface of an optical path bending structure; Drear refers to a distance from the bending surface of the optical path bending structure to an upper surface; CA1st refers to an effective diameter of the outermost subject-side surface of the first lens group; D1 refers to a distance from an entrance pupil of the lens assembly to the bending surface of the optical path bending structure; and Y refers to an image upper-height at a maximum view angle.

According to various embodiments each lens assembly may include the first lens group, the bending structure, and the second lens group disposed from near a subject, and is configured to satisfy following [Conditional formula 7]:

$0.7<(dY/d\Theta)(\Theta)/(dY/d\Theta)(0)<1.3$
wherein $0 \leq \Theta \leq (FOV/2)$      [Conditional formula 7]

wherein FOV refers to a maximum view angle, and $dY/d\Theta(\Theta)$ refers to a first derivative, with regard to $\Theta$, of function $Y=f(\Theta)$ that describes a relationship between view angle ($\Theta$) and image height (Y).

According to various embodiments the first lens group of the lens assembly may include a plurality of lenses, and the plurality of lenses may include: a first lens having negative refractive power, a second lens having negative refractive power; a third lens having negative refractive power; and a fourth lens having positive refractive power.

According to various embodiments, the first lens group may include a plurality of lenses, and the plurality of lenses may include: a plurality of lenses configured to have negative refractive power and disposed successively from near a subject; and at least one lens configured to have positive refractive power.

According to various embodiments, each lens assembly may include a rectangular image sensor, and the image sensor may have an image-forming surface configured to have a long side disposed perpendicularly to a plane defined by optical axes of the first lens groups disposed on respective lens assemblies or by optical axes of the second lens groups disposed on respective lens assemblies.

According to various embodiments, each lens assembly may include the first lens group, the bending structure, the second lens group, and the image sensor disposed from near the subject, and is configured to satisfy following [Conditional formula 8] and [Conditional formula 9], respectively:

$130<FOV\_hori<150$      [Conditional formula 8]

$185<FOV\_virt<200$      [Conditional formula 9]

wherein FOV_hori refers to a view angle of a short-side upper-height of the image sensor, and FOV_virt refers to a view angle of a long-side upper-height of the image sensor.

According to various embodiments, the lens assembly may further include a fourth lens assembly disposed above or below the three lens assemblies disposed on the same horizontal plane, and the optical axis of the lens group of the fourth lens assembly may be perpendicular to the optical axes of the first lens groups disposed on the three lens assemblies, respectively, and exist on a straight line extending through a point at which the first lens groups meet.

According to various embodiments, there may be provided an optical device including a plurality of optical system structures, at least some optical system structures of the plurality of optical system structures including: a case including front surface on which an opening is formed; a lens assembly disposed in the case, the lens assembly including a first lens group including a combination of a plurality of lenses, a second lens group, and a bending structure configured to bend a path of light of the first lens group and to transfer the path of light to the second lens group; and a seating portion disposed in the case such that the first lens group or the second lens group is seated thereon, wherein an outermost lens of the first lens group is exposed to the opening, and optical axes of the first lens groups disposed on respective optical system structures are configured to be perpendicular to the optical axes of the second lens groups.

According to various embodiments, assuming that circle A is configured to have a single point at the center thereof and to have radius a connecting apexes of outermost lenses of respective first lens groups at the single point, circle B is configured to have the single point at the center thereof and to have radius b connecting centers of bending surfaces of respective bending structures at the single point, and circle C is configured to have the single point at the center thereof and to have radius c connecting centers of upper surfaces of respective image sensors at the single point, then respective circles may be configured to radius values of a>c>b.

According to various embodiments, the optical device may further include an image sensor having a short-side direction disposed in parallel with the optical axis of the first lens group; optical axes of the first lens groups disposed on respective optical system structures may be disposed on the same plane; the angle between each optical axis and an adjacent optical axis, which meet at the single point, may be 120°; and the angle between the optical axis of each first lens group and the optical axis of the second lens group of an adjacent optical system structure may be 30°.

According to various embodiments, the optical device may further include a heat-radiating structure disposed between circle A and circle C so as to radiate heat from the image sensor.

According to various embodiments, the optical device may further include an optical-axis adjustment structure disposed to have a single axis formed on the optical axis of the first lens group so as to compensate for the amount of rotational error of each lens structure and the image sensor.

An optical device according to various embodiments of the disclosure may include at least n identical optical system structures including lens groups (n≥3), the optical axes f' of the lens groups of respective optical system structures may be disposed on the same plane, and line segments connecting intersection points e' at which extension lines of respective optical axes f' meet may form a regular polygon with n sides.

According to various embodiments, an image sensor may be provided on one side of each lens group. If m=n in connection with a line segment l connecting the intersection points e', the parallax distance c' of each lens group does not vary even if the distance b' between the upper-surface centers of adjacent image sensors changes, or even if the distance a' from one point o' of intersection of extension lines of upper surfaces of the image sensors to the image upper surfaces of the image sensors changes. If m<n in connection with a line segment l connecting the intersection points e', the parallax distance c' may decrease depending on the ratio of m and n and, if m>n in connection with a line segment l connecting the intersection points e', the parallax distance c' may increase depending on the ratio of m and n.

In this regard, n refers to a distance from the image upper surface of the image sensor on an oblique side defined by an optical axis f' to the apex of the front surface of the image upper surface, and m refers to a distance from the image upper surface of the image sensor 714 on an oblique side defined by an optical axis to the apex of the rear surface of the image upper surface.

According to various embodiments, the upper surfaces of image sensors of respective optical system structures may form at an angle (d') of 360°/n.

According to various embodiments, the optical axis of each of the lens groups and the optical axis of an adjacent lens group may intersect at an intersection point e', and the number of intersection points of the optical axes may be identical to the number of optical system structures including the lens groups. The optical axes may be disposed at angle of 180(n−2)/n.

According to various embodiments, a heat-radiating structure may be additionally disposed between a circle h' connecting the apexes of outermost lenses of respective lens groups and a regular polygon g' made of optical axes of respective lens groups so as to radiate heat generated by the image sensors.

While the disclosure has been shown and described with reference to certain embodiments thereof, it will be understood by those skilled in the art that various changes in form and details may be made therein without departing from the spirit and scope of the disclosure as defined by the appended claims.

What is claimed is:

1. A lens assembly structure comprising at least three lens assemblies, each of the at least three lens assemblies comprising:
a first lens group having positive refractive power or negative refractive power;
a second lens group having positive refractive power; and
a bending structure for bending a path of light of the first lens group so as to correspond to an optical-axis direction of the second lens group, the bending structure being disposed on the path of light of the first lens group and on a path of light of the second lens group,
wherein three first optical axes of the first lens groups of the at least three lens assemblies meet at a point, and
wherein a triangle is formed by a combination of three edges respectively corresponding to three second optical axes of the second lens groups of the at least three lens assemblies.

2. The lens assembly structure of claim 1, wherein each of the at least three lens assemblies is disposed from a subject side to the first lens group, the bending structure, and the second lens group, and is configured to satisfy following [Conditional formula 1], [Conditional formula 2], and [Conditional formula 3]:

$EffD\_ReflctS^2)/(F^*2Y)<3.0$      [Conditional formula 1]

$D1/Drear<1.0$      [Conditional formula 2]

$5<D1/F<10$      [Conditional formula 3]

(The EffD_ReflctS refers to an effective diameter of a bending surface of the bending structure; the F refers to a focal distance of an entire lens assembly structure; the Y refers to an image upper-height at a maximum view angle; the D1 refers to a distance from an entrance pupil of the lens assembly to the bending surface of the bending structure; and the Drear refers to a distance from the bending surface of the bending structure to an upper surface).

3. The lens assembly structure of claim 1, wherein an angle between the three first optical axes of the first lens groups of the at least three lens assemblies, is 120°, an angle between the second optical axes of the second lens groups of the at least three lens assemblies is 60°, and the triangle is a regular triangle.

4. The lens assembly structure of claim 1, wherein each of the at least three lens assemblies is disposed from a subject side to the first lens group, the bending structure, and the second lens group, and is configured to satisfy following [Conditional formula 4], [Conditional formula 5], and [Conditional formula 6]:

$$6 < Drear/F < 11 \qquad \text{[Conditional formula 4]}$$

$$0.9 < Dfront/Drear < 1.4 \qquad \text{[Conditional formula 5]}$$

$$0.8 < sqrt[\{(CA1st/2)^2 + D1^2\}/\{(Drear^2 + Y^2)\}] < 1.2 \qquad \text{[Conditional formula 6]}$$

(The F refers to a focal distance of an entire lens assembly structure; the Dfront refers to a distance from a subject-side apex of the first lens group to a bending surface of the bending structure; the Drear refers to a distance from the bending surface of the bending structure to an upper surface; the CA1st refers to an effective diameter of an outermost subject-side surface of the first lens group; the D1 refers to a distance from an entrance pupil of the lens assembly to the bending surface of the bending structure; and the Y refers to an image upper-height at a maximum view angle).

5. The lens assembly structure of claim 1, wherein each of the at least three lens assemblies is disposed from a subject side to the first lens group, the bending structure, and the second lens group, and is configured to satisfy following [Conditional formula 7]:

$$0.7 < (dY/d\Theta)(\Theta)/(dY/d\Theta)(0) < 1.3$$
wherein $0 \leq \Theta \leq (FOV/2)$ [Conditional formula 7]

(The FOV refers to a maximum view angle, and the $dY/d\Theta(\Theta)$ refers to a first derivative, with regard to $\Theta$, of function $Y=f(\Theta)$ that describes a relationship between view angle ($\Theta$) and image height (Y)).

6. The lens assembly structure of claim 1, wherein the first lens group comprises a plurality of lenses, and the plurality of lenses comprise:
a first lens having negative refractive power;
a second lens having negative refractive power;
a third lens having negative refractive power; and
a fourth lens having positive refractive power.

7. The lens assembly structure of claim 1, wherein the first lens group comprises a plurality of lenses, the plurality of lenses:
have negative refractive power and are disposed successively from near a subject, and comprise:
at least one lens configured to have positive refractive power.

8. The lens assembly structure of claim 2, wherein each of the at least three lens assemblies comprises a rectangular image sensor, and
wherein the rectangular image sensor has an image-forming surface configured to have a long side disposed perpendicularly to a plane defined by the first optical axes of the first lens groups or by the second optical axes of the second lens groups.

9. The lens assembly structure of claim 8, wherein each of the at least three lens assembly is disposed from a subject side to the first lens group, the bending structure, the second lens group, and the rectangular image sensor, and is configured to satisfy following [Conditional formula 8] and [Conditional formula 9]:

$$130 < FOV\_hori < 150 \qquad \text{[Conditional formula 8]}$$

$$185 < FOV\_virt < 200 \qquad \text{[Conditional formula 9]}$$

(The FOV_hori refers to a view angle of a short-side upper-height of the rectangular image sensor, and the FOV_virt refers to a view angle of a long-side upper-height of the rectangular image sensor).

10. The lens assembly structure of claim 1, further comprising a fourth lens assembly disposed above or below the at least three lens assemblies arranged on a same horizontal plane,
wherein an optical axis of a first lens group of the fourth lens assembly is perpendicular to the three first optical axes of the first lens groups of the at least three lens assemblies and exists on a straight line extending through the point at which the three first optical axes meet.

11. An optical device comprising at least three optical system structures, each of the at least three optical system structures comprising:
a case having an open front surface;
a lens assembly disposed in the case, the lens assembly comprising a first lens group consisted of a combination of a plurality of lenses, a second lens group, and a bending structure for bending a path of light of the first lens group and for transferring the path of light to the second lens group, an outermost lens of the first lens group being exposed to an opening; and
a seating portion disposed in the case, which to seat the first lens group or the second lens group,
wherein three first optical axes of the first lens groups of the at least three optical system structures are configured to be perpendicular to three second optical axes of the second lens groups of the at least three optical system structures, and
wherein the three first optical axes of the first lens groups of the at least three optical system structures meet at a single point, and
wherein a triangle is formed by a combination of three edges respectively corresponding to the three second optical axes of the second lens groups of the at least three optical system structures.

12. The optical device of claim 11,
wherein apexes of outermost lenses of the first lens groups of the at least three optical system structures are located along a first circle configured to have the single point at a center thereof and to have a first radius a, and
wherein centers of bending surfaces of the bending structures of the at least three optical system structures are located along a second circle configured to have the single point at a center thereof and to have a second radius b, and
wherein centers of surfaces of image sensors of the at least three optical system structures are located along a third circle configured to have the single point at a center thereof and to have a third radius c, and
wherein values of the first radius, second radius, and the third radius are configured to be a>c>b.

13. The optical device of claim 11, each of the at least three optical system structures further comprising:

an image sensor having a short-side direction disposed in parallel with the optical axis of the first lens group, wherein the three first optical axes of the first lens groups of the at least three optical system structures are disposed on a same plane, an angle between the three first optical axes of the first lens groups of the at least three optical system structures is 120°, and an angle between the first optical axis of the first lens group of one optical system structure and the second optical axis of the second lens group of an adjacent optical system structure is 30°.

14. The optical device of claim 12, each of the at least three optical system structures further comprising:

a heat-radiating structure disposed between the apexes of the outermost lenses of the first lens group of the at least three optical system structures and the centers of the surfaces of the image sensor, which radiates heat from the image sensor.

15. The optical device of claim 13, further comprising:

an optical-axis adjustment structure disposed to have a single axis formed on the first optical axis of the first lens group, which compensates for an amount of rotational error of each lens structure and the image sensor.

\* \* \* \* \*